(12) United States Patent
Livanec

(10) Patent No.: US 9,593,276 B2
(45) Date of Patent: Mar. 14, 2017

(54) REVERSIBLY COAGULATABLE AND REDISPERSABLE POLYMER INCLUDING AT LEAST ONE MONOMER INCLUDING A SWITCHABLE-AMPHIPHILIC FUNCTIONAL GROUP AND METHODS OF USING THE SAME

(71) Applicant: Halliburton Energy Services, Inc., Houston, TX (US)

(72) Inventor: Philip Wayne Livanec, Deer Park, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 249 days.

(21) Appl. No.: 13/725,376

(22) Filed: Dec. 21, 2012

(65) Prior Publication Data
US 2014/0179567 A1 Jun. 26, 2014

(51) Int. Cl.
C09K 8/68 (2006.01)
C09K 8/00 (2006.01)
C09K 8/035 (2006.01)

(52) U.S. Cl.
CPC .......... *C09K 8/00* (2013.01); *C09K 8/035* (2013.01)

(58) Field of Classification Search
CPC .......... E21B 7/128; E21B 47/00; E21B 47/06; E21B 10/55; E21B 2033/005; E21B 33/00; E21B 33/068; E21B 34/14; E21B 41/0092; E21B 43/12; E21B 43/16; E21B 43/24; E21B 43/26; E21B 43/267; E21B 43/34; E21B 47/12; E21B 23/01; E21B 23/03; E21B 23/14; E21B 27/00; E21B 29/00; E21B 29/005; E21B 29/02; E21B 33/035; E21B 33/06; E21B 33/12; E21B 33/1208; E21B 33/13; E21B 33/146; E21B 34/00; E21B 34/02; C09K 8/52; C09K 8/68; C09K 8/80; C09K 2208/30; C09K 8/18; C09K 8/206; C09K 8/36; C09K 8/426; C09K 8/44; C09K 8/601; C09K 8/62; C09K 8/706; C09K 8/805
See application file for complete search history.

(56) References Cited

U.S. PATENT DOCUMENTS

| | | | |
|---|---|---|---|
| 4,342,657 A | 8/1982 | Blair | |
| 7,816,305 B2* | 10/2010 | Saini | C09K 8/584 166/305.1 |
| 2008/0214413 A1* | 9/2008 | Ewanek | E21B 7/00 507/225 |
| 2010/0093874 A1 | 4/2010 | Monin et al. | |
| 2011/0053812 A1* | 3/2011 | Ezell | C09K 8/035 507/219 |
| 2011/0100402 A1* | 5/2011 | Soane | C09K 8/584 134/29 |
| 2011/0257334 A1* | 10/2011 | Jessop | C07C 257/14 525/50 |
| 2012/0073817 A1 | 3/2012 | Van Zanten | |
| 2012/0132423 A1 | 5/2012 | Livanec et al. | |
| 2013/0105161 A1* | 5/2013 | Funkhouser | C04B 24/163 166/293 |

FOREIGN PATENT DOCUMENTS

| | | |
|---|---|---|
| CN | 102382242 A | 3/2012 |
| CN | 102452964 A | 5/2012 |
| WO | WO-2011023966 A1 | 3/2011 |
| WO | WO-2011050469 A1 | 5/2011 |
| WO | WO-2014099646 A1 | 6/2014 |

OTHER PUBLICATIONS http://simscience.org/membranes/advanced/essay/surfactants.html downloaded on Oct. 14, 2015.*
Q. Zhang, G. Yu, W. Wang, H Yuan, B, Li, ands S. Zhu, Preparation of N2/CO2 triggered reversibly coagutable and redispersible latexes by emulsion polymerization of styrene with a reactive switchable surfactant, Langmuir, 2012, 28, 5940-5946.*
Mihara, M., et al., "Redispersible Polymer Colloids Using Carbon Dioxide as an External Trigger", Macromolecules, 44, (2011), 3688-3693.
Su, X., et al., "Surfactant-Free Polymerization Forming Switchable Latexes That Can Be Aggregated and Redispersed by CO2 Removal and Then Readdition", Macromolecules, 45, (2012), 666-670.
Zhang, Q., et al., "Reversibly Coagulatable and Redispersible Polystyrene Latex Prepared by Emulson Polymerization of Styrene Containing Switchable Amidine", Macromolecules, 44, (2011), 6539-6545.
Zhang, Qi, "Preparation of N2/CO2 Triggered Reverisbly Coagulatable and Redispersible Latexes by Emulsion Polymerization of Styrene with a Reactive Switchable Surfactant", Langmuir, vol. 28, (2012), 5940-5946.
"International Application Serial No. PCT/US2013/074911, International Search Report mailed Mar. 26, 2014", 3 pgs.
"International Application Serial No. PCT/US2013/074911, Written Opinion mailed Mar. 26, 2014", 8 pgs.
Aydogan. Nihal, et al. "Comparison of the Surface Activity and Bulk Aggregation of Ferrocenyl Surfactants with Cationic and Anionic Headgroups", *Langmuir*, 17(19), (2001), 5703-5706.
"European Application Serial No. 13864461.2, Office Action mailed Jun. 26, 2015", 2 pgs.
"International Application Serial No. PCT/US20131074911, International Preliminary Report on Patentability mailed Jul. 2, 2015", 10 pgs.

(Continued)

*Primary Examiner* — Kumar R Bhushan
(74) *Attorney, Agent, or Firm* — Tenley Krueger Tumey LLP

(57) ABSTRACT

The present invention relates to a polymer including at least one monomer comprising a switchable-amphiphilic functional group. Various embodiments provide a methods of treating a subterranean formation with the polymer, compositions including the polymer, and methods of making compositions including the polymer.

19 Claims, 8 Drawing Sheets

(56) References Cited

OTHER PUBLICATIONS

Fowler, Candace I., et al., "Emulsion Polymerization of Styrene and Methyl Methacryiate Using Cationic Switchable Surfactants", *Macromolecules*, 44(8), (2011), 2501-2509.
"Australian Application Serial No. 2013363280, Response filed Apr. 28, 2016 to Subsequent Examiners Report mailed Jan. 19, 2016", 21 pgs.
"Australian Application Serial No. 201363280, First Examiner Report mailed Jul. 28, 2015", 3 pgs.
"Australian Application Serial No. 2013363280, Response filed Dec. 13, 2015 to First Examiner Report mailed Jul. 28, 2015", 16 pgs.
"Australian Application Serial No. 2013363280, Subsequent Examiners Report mailed Jan. 19, 2016", 2 pgs.
"Canadian Application Serial No. 2,891,685, Office Action mailed May 12, 2016", 4 pgs.
"European Application Serial No. 13864461.2, Extended European Search Report mailed Jun. 10, 2016", 4 pgs.
"European Application Serial No. 13864461.2, Response filed Oct. 26, 2015 to Office Action mailed Jun. 26, 205", 8 pgs.

\* cited by examiner

REVERSIBLY COAGULATABLE AND
REDISPERSABLE POLYMER INCLUDING
AT LEAST ONE MONOMER INCLUDING A
SWITCHABLE-AMPHIPHILIC FUNCTIONAL
GROUP AND METHODS OF USING THE
SAME

BACKGROUND OF THE INVENTION

A latex is a stable dispersion (e.g., emulsion) of polymer particles, for example microparticles, in an aqueous medium. Latex solutions are valuable in many different applications. In one example, latex solutions can be used as a component of drilling fluids (e.g., water-based mud) used for drilling into and extracting material from subterranean formations. In one example, tar generated by subterranean formations can form emulsions in drilling fluid that are difficult and costly to separate. By adding a latex solution to drilling fluids, the tar can become encapsulated by the latex, mitigating tar accretion and screen blinding, and significantly decreasing the difficulty of separating the tar from the materials removed from the wellbore. In other examples, latex solutions can modify the viscosity of the drilling liquid or of a cement solution.

When a latex solution is dried, the polymer particles often cannot be easily redispersed to form a latex solution. Therefore, generally latex is shipped as an aqueous solution with over 50 weight percent of the material being water, which can cause shipping costs to be high. In addition, freezing a latex solution generally causes the latex emulsion to break, after which the polymer particles often cannot be easily redispersed to re-form a latex solution. When drilling and cementing are to occur at locations that experience below-freezing temperatures, the latex solution must be heated to prevent freezing, which can be expensive.

SUMMARY OF THE INVENTION

In various embodiments, the present invention provides a composition for treatment of a subterranean formation including at least one polymer. The polymer includes at least one monomer that includes a switchable-amphiphilic functional group. The composition also includes at least one of a drilling fluid, stimulation fluid, fracking fluid, spotting fluid, clean-up fluid, production fluid, completion fluid, remedial treatment fluid, abandonment fluid, pill, acidizing fluid, and a cementing fluid.

In various embodiments, the present invention provides a method of treating a subterranean formation. The method includes including obtaining or providing a polymer. The polymer includes at least one monomer that includes a switchable-amphiphilic functional group. The method also includes contacting the polymer with a subterranean material downhole.

In various embodiments, the present invention provides a method of preparing an aqueous composition for treatment of a subterranean formation. The method includes obtaining or providing a polymer. The polymer includes at least one monomer including a switchable-amphiphilic functional group. The method also includes combining the polymer with at least one of a water-based drilling fluid or pill and an aqueous mixture including at least one of a drilling fluid, stimulation fluid, fracking fluid, spotting fluid, clean-up fluid, production fluid, completion fluid, remedial treatment fluid, abandonment fluid, pill, acidizing fluid, and a cementing fluid.

Various embodiments of the present invention provide certain advantages over other latex polymers and methods of using the same, at least some of which are unexpected. The formation of the dispersion can be controlled by ionizing the switchable-amphiphilic functional group, for example by bubbling $CO_2$ through the solution. Unlike most other polymers, in various embodiments the undispersed latex polymer can be easily dispersed into a stable emulsion. The dispersion can be performed from a dry powder which can be shipped and stored more efficiently than a ready-made latex solution. Unlike most latex polymers, in various embodiments a dispersion can be easily and advantageously prepared from a latex polymer that has been frozen in solution and as a result has had the polymer particles precipitate or agglomerate out of the emulsion.

In some examples, the polymers of the present invention can be controllably caused to fully or partially agglomerate and come out of the dispersion by neutralizing the switchable-amphiphilic functional group of at least some of the polymers, for example, by application of heat or bubbling gas. Therefore, as compared to most other polymers, the degree of emulsion or other related properties can be more easily controlled. By controlling the degree of emulsion, the viscosity of the resulting mixture can be controlled, which can be useful for a variety of wellbore applications. Since the degree to which the polymer is dispersed can be easily controlled by ionization or neutralization, the formation of the dispersion or the adjustment of the degree of dispersion or other properties can advantageously occur with high degrees of control over the time and location of the adjustment. For example, in various embodiments, the degree of dispersion or other properties can be controlled to occur downhole in or near one or more hydrocarbon- or water-producing subterranean formations at one or more desired times, which is not possible with most other latex polymers. In an example, the properties of a composition including the polymer can be advantageously adjusted in one particular location of the borehole to be different than the properties of the composition in another portion of the borehole.

In various embodiments, the monomer including a switchable-amphiphilic functional group can be included in any known latex polymer to modify its properties to include the ability to reversibly coagulate and redisperse. The structure of the monomer including the switchable amphiphilic group, the structure of the other monomers, or the ionizing agent used can be varied to adjust the degree of dispersion or coagulation under various conditions and to adjust the conditions necessary to bring about a desired degree of dispersion or coagulation. For example, by suitably varying the structure of the monomer including the switchable-amphiphilic group, the type or concentration of ionizing agent needed to induce a particular degree of dispersibility or coagulation can be advantageously varied. In another example, by suitably varying the structure of the monomer, the degree of agglomeration or dispersion in a given set of conditions such as temperature and chemical environment can be controlled. In some embodiments, the inclusion of the monomer including the switchable-amphiphilic groups in a latex polymer can advantageously produce a latex having a narrower molecular weight distribution than other latexes, allowing the properties of a mixture of the polymer and at least one of a drilling fluid, stimulation fluid, fracking fluid, spotting fluid, clean-up fluid, production fluid, completion fluid, remedial treatment fluid, abandonment fluid, pill, acidizing fluid, and a cementing fluid to be more precisely controlled than with other latexes.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Figure 1:
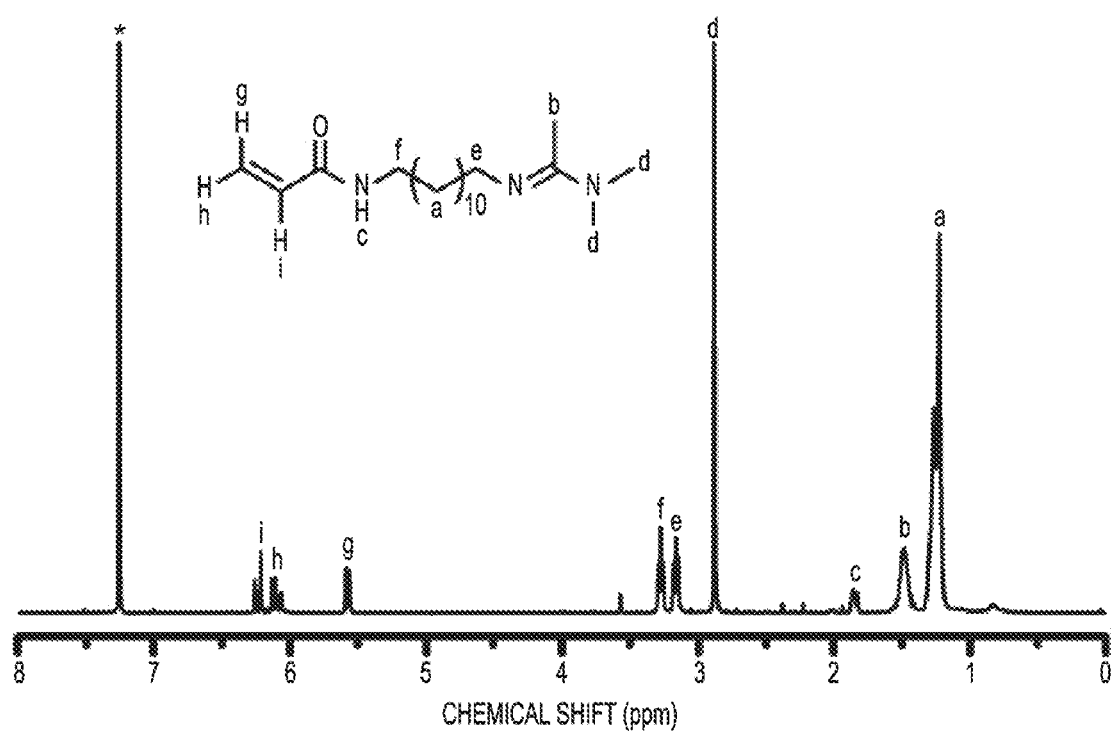
FIG. 1 illustrates the $^1$H NMR spectrum of DAm in $CDCl_3$, according to various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule, or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR', OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$N(R')C(O)R', (CH$_2$)$_{0-2}$N(R')N(R')$_2$, N(R')N(R')C(O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(=NH)N(R')$_2$, C(O)N(OR')R', or C(=NOR')R' wherein R' can be hydrogen or a carbon-based moiety, and wherein the carbon-based moiety can itself be further substituted; for example, wherein R' can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R' can be independently mono- or multi-substituted with J; or wherein two R' groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH ($CH_3$), —CH=C($CH_3$)$_2$, —C($CH_3$)=$CH_2$, —C($CH_3$)=CH($CH_3$), —C($CH_2CH_3$)=$CH_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C($CH_3$), —C≡C($CH_2CH_3$), —$CH_2$C≡CH, —$CH_2$C≡C($CH_3$), and —$CH_2$C≡C($CH_2CH_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) group is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cyclo alkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl group are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing 3 or more ring members, of which, one or more is a heteroatom such as, but not limited to, N, O, and S. Thus a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms sums up to equal the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structures are substituted therewith.

The term "amine" as used herein refers to primary, secondary, and tertiary amines having, e.g., the formula $N(group)_3$ wherein each group can independently be H or non-H, such as alkyl, aryl, and the like. Amines include but are not limited to $R-NH_2$, for example, alkylamines, arylamines, alkylarylamines; $R_2NH$ wherein each R is independently selected, such as dialkylamines, diarylamines, aralkylamines, heterocyclylamines and the like; and $R_3N$ wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form $-NH_2$, $-NHR$, $-NR_2$, $-NR_3^+$, wherein each R is independently selected, and protonated forms of each, except for $-NR_3^+$, which cannot be protonated. Accordingly, any compound substituted with an amino group can be viewed as an amine. An "amino group" within the meaning herein can be a primary, secondary, tertiary or quaternary amino group. An "alkylamino" group includes a monoalkylamino, dialkylamino, and trialkylamino group.

The terms "halo" or "halogen" or "halide", as used herein, by themselves or as part of another substituent mean, unless otherwise stated, a fluorine, chlorine, bromine, or iodine atom, preferably, fluorine, chlorine, or bromine.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

As used herein, "degree of polymerization" is the number of repeating units in a polymer.

As used herein, the term "polymer" refers to a molecule having at least one repeating unit.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as the formation of the wellbore.

As used herein, the term "stimulation fluid" refers to fluids or slurries used downhole during stimulation activities of the well that can increase the production of a well, including perforation activities. In some examples, a stimulation fluid can include a fracking fluid, or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracking fluid" refers to fluids or slurries used downhole during fracking operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments, or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "subterranean material" or "subterranean formation" refers to any material under the surface of the earth, including under the surface of the bottom of the ocean. For example, a subterranean material can be any section of a wellbore, including any materials placed into the wellbore such as cement, drill shafts, liners, or screens. In some examples, a subterranean material can be any section of underground that can produce liquid or gaseous petroleum materials or water.

As used herein, the term "hydrocarbyl" refers to a functional group derived from a straight chain, branched, or cyclic hydrocarbon, such as an alkyl, alkenyl, alkynyl, aryl, cycloalkyl, acyl, or a combination thereof.

Method of Using the Polymer to Treat a Subterranean Formation.

In various embodiments, the present invention provides a method including obtaining or providing the polymer having a monomer including the switchable-amphiphilic functional group, and contacting the polymer with a subterranean material downhole. By utilizing polymers having a suitable structure of the monomer having the switchable-amphiphilic group or of the other monomers, by ionizing various percentages of the switchable-amphiphilic functional group of the polymer, or by using different ionizing agents, the viscosity and other properties of a composition including the polymer, such as a composition including an emulsion of the polymer, can be varied.

In some embodiments, the method includes combining the polymer with at least one of a drilling fluid, stimulation fluid, fracking fluid, spotting fluid, clean-up fluid, production fluid, completion fluid, remedial treatment fluid, abandonment fluid, pill, acidizing fluid, and a cementing fluid to form a mixture, and subsequently contacting the subterranean material with the mixture.

In some examples, the method includes putting the polymer downhole in a dried or non-aqueous state (e.g. in a mixture with a predominantly non-aqueous liquid) with the subterranean material. In some examples, the method includes contacting the polymer in a dried or non-aqueous state (e.g. in a mixture with a non-aqueous liquid) with the subterranean material. In other examples, the polymer can be contacted with a liquid that includes water while downhole and prior to or during contacting with the subterranean material. The polymer can subjected to conditions suitable for forming an emulsion (e.g., ionized and agitated) while downhole and prior to or during contacting with the subterranean material. In other embodiments, the polymer can be contacted with water downhole, and can be ionized or neutralized once or several times downhole as needed to accomplish a desired contacting with a subterranean material, such as to modify the viscosity properties of the surrounding liquid as desired. In some embodiments, the polymer is not subjected to conditions suitable for forming an emulsion prior to or during contacting with the subterranean material.

In some examples, the method includes combining the polymer with a liquid that includes water prior to placing the composition downhole. In some embodiments, the polymer is combined with an aqueous liquid and then subjected to emulsion-forming conditions (e.g., ionized and agitated) prior to combining the polymer with other components such as a drilling fluid, stimulation fluid, fracking fluid, spotting fluid, clean-up fluid, production fluid, completion fluid, remedial treatment fluid, abandonment fluid, pill, acidizing fluid, or cementing fluids and prior to placing the polymer downhole. The polymer can be combined with a drilling fluid, stimulation fluid, fracking fluid, spotting fluid, clean-up fluid, production fluid, completion fluid, remedial treatment fluid, abandonment fluid, pill, acidizing fluid, or a cementing fluid and subjected to conditions suitable for forming an emulsion after placing the aqueous polymer solution downhole and prior to or during contacting with the subterranean material. The polymer can be ionized or neutralized once or several times above ground or downhole, including prior to or during contacting with the subterranean material, as is suitable to achieve the desired properties or effect.

The method can include the step of forming or increasing the extent of an aqueous emulsion of the polymer. The aqueous emulsion can be formed between the polymer and water or brine, or a mixture including water, such as a mixture that includes at least one of a drilling fluid, stimulation fluid, fracking fluid, spotting fluid, clean-up fluid, production fluid, completion fluid, remedial treatment fluid, abandonment fluid, pill, acidizing fluid, and a cementing fluid. The emulsion can be formed or increased by ionizing a sufficient number of the switchable-amphiphilic groups included in the polymer. Any suitable method of ionizing is encompassed as an embodiment of the present invention. In some examples, the ionization can occur by bubbling $CO_2$ through the aqueous liquid containing the polymer. By bubbling $CO_2$ through the mixture, small amounts of carbonic acid can form ($H_2CO_3$) in equilibrium with water and carbon dioxide. In some embodiments, carbonic acid can ionize the switchable-amphiphilic group. For example, in embodiments wherein the switchable-amphiphilic group is an amidine group, the carbonic acid can acidify the amidine group to form an amidinium ion which can have a bicarbonate ($HCO_3^-$) counterion. In other embodiments, any acidifying substance can be added to the aqueous mixture of the polymer to ionize the switchable-amphiphilic groups. In some embodiments, the acid can be any organic acid such as acetic acid, formic acid, lactic acid, citric acid, or any mineral acids such as sulfamic acid, $H_2SO_4$ or HCl. Some acids and the corresponding conjugate base counterion can be more difficult to remove from the switchable-amphiphilic group than other acids. Likewise, some acids can cause the polymer to be more or less susceptible to emulsion formation than other acids. In some embodiments, forming the emulsion can also include subjecting the polymer to sufficient agitation. Agitation can occur via any suitable means. For example, agitation can occur via sonication, acoustics, vibration, bubbling, stirring, or shaking. In various embodiments, conditions downhole can include sufficient agitation such that an emulsion can form without any extra application of agitation, e.g., agitation from drilling or other downhole activities can be sufficient. In some embodiments, the method includes a step of ionizing the switchable-amphiphilic groups to an extent that at least partial gellation of the composition occurs. In some embodiments having switchable-functional groups other than amidine, application of a base to the switchable-amphiphilic group can be sufficient to cause ionization.

In various embodiments, the method can include the step of breaking or lessening an aqueous emulsion of the polymer. Breaking or lessening the emulsion can include neutralizing the ionized switchable-amphiphilic group. Any suitable method of neutralizing the ionized switchable-amphiphilic groups is encompassed as an embodiment of the present invention. In some examples, the neutralization can occur by using application of sufficient amounts of heat to liberate the ionizing compound from the ionized switchable-amphiphilic group. For example, application of a sufficient amount of heat to a carbonic acid-ionized amidinium group can liberate carbonic acid from the group to restore the amidine group. The carbonic acid can then exist in equilibrium with $CO_2$, which bubbles rise and leave the solution, driving the neutralization forward; thus, carbonic acid can be a particularly advantageous ionizing agent due to the ease of neutralization. In some examples, the heat applied can be 20-1000° C., 30-500° C., 40-250° C., or about 50-100° C. In addition or alternatively, by bubbling a sufficient amount of gas through the aqueous emulsion, the switchable-amphiphilic groups can be neutralized. For example, a gas such as air, an inert gas such as $N_2$ or Ar, or any suitable combination thereof, can be bubbled through the aqueous emulsion at a suitable rate. In some embodiments, the bubbling of the gas can advantageously cause $CO_2$ liberated from a carbonic acid-ionized switchable-amphiphilic group to move away from the liberated switchable-amphiphilic group more rapidly, speeding the neutralization. In another example, an acid or base can be contacted with the polymer including the switchable-amphiphilic groups under conditions sufficient to neutralize the ionized functional group.

Composition Including Polymer.

In various embodiments, the present invention provides a composition that includes at least one polymer including at least one monomer including the switchable-amphiphilic functional group, and another component with which the polymer forms a mixture that is suitable for contacting with a subterranean material downhole, such as for use in the extraction of petroleum materials from subterranean formations. For example, the mixture can be suitable for contacting with a downhole subterranean material for use in the extraction of liquid or gaseous petroleum materials, water, or any combination thereof. In one example, the composition can include the polymer and a mixture comprising at least one of a drilling fluid, stimulation fluid, fracking fluid, spotting fluid, clean-up fluid, production fluid, completion fluid, remedial treatment fluid, abandonment fluid, pill, acidizing fluid, and a cementing fluid, wherein the mixture can be an aqueous mixture. For example, the composition can include the polymer and a water-based drilling fluid or pill. In another example, the composition can include the polymer and an aqueous mixture including at least one of cement and cement kiln dust. In some embodiments, in the composition the switchable-amphiphilic functional groups in the polymer are predominantly in an ionized form, and wherein the polymer forms an emulsion with the other components of the composition. In some embodiments, in the composition the switchable-amphiphilic functional groups in the polymer are predominantly in a neutralized form, and wherein the polymer does not form an emulsion with the other components of the composition. The polymer can be present in any suitable wt % in the composition. For example, the polymer can be present in about 0.000.001 wt % or less, or about 0.000.01%, 0.000.1%, 0.001%, 0.01, 0.1, 1, 2, 3, 4, 5, 10, 15, 20, 30, 40, or about 50 wt % or more of the composition.

By modifying the structure of the monomer including the switchable-amphiphilic group or of the other monomers, ionizing various percentages of the switchable-amphiphilic functional group of the polymer, or by using different ionizing agents, the viscosity and other properties of a composition including the polymer, such as a composition including an emulsion of the polymer, can be varied. Properties that can be varied can include, for example, at least one of viscosity (e.g., thinning or thickening of the liquid, including for example gelling of the liquid), density, surface tension (e.g. intraficial surface tension of the emulsion), size of the droplets or particles in the emulsion, stability of the emulsion, vapor pressure, propensity toward foaming or toward retention of foam, and ease of reversibility of the emulsion via neutralization. By virtue of the switchable-amphiphilic functional groups of the polymer, the variation of the properties can be advantageously caused to occur prior to the desired use of the composition, or at the location where the particular properties are desired. The variation of the properties can be advantageously caused to occur in a portion of the composition near or at the site where the particular properties are desired, while allowing the properties of the remainder of the composition to remain the same. In various embodiments, any suitable percentage of the switchable-amphiphilic groups of the polymers can be ionized or neutralized. For example, about 0.0001% or less of the switchable-amphiphilic groups can be ionized, or about 0.001%, 0.01, 0.1, 1, 2, 3, 4, 5, 10, 15, 20, 30, 40, 50, 60, 70, 80, 85, 90, 95, 96, 97, 98, 99, 99.9, 99.99, 99.999, or about 99.9999% or more of the switchable-amphiphilic groups can be ionized, with the remainder being neutral, and with the percents being given in mol %.

A drilling fluid, also known as a drilling mud or simply "mud," is a specially designed fluid that is circulated through a wellbore as the wellbore is being drilled to facilitate the drilling operation. The drilling fluid can carry cuttings up from beneath and around the bit, transport them up the annulus, and allow their separation. Also, a drilling fluid can cool and lubricate the drill head as well as reducing friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks penetrated and also to form a thin, low permeability filter cake which temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

The polymer can form a useful combination with downhole fluids such as drilling fluids. For example, the polymer can be used to modify the viscosity of the drilling fluid or other downhole fluid at a desired time or in a desired place, such as before or after placing the drilling fluid or other fluid downhole, or before, during, or after contacting a subterranean material with the drilling fluid or other fluid. In some embodiments, the composition advantageously allows adjustment of the viscosity or other properties of the drilling fluid or other fluid as needed while the drilling fluid or other fluid is being used. In some examples, the composition allows the viscosity or other properties of the drilling fluid or other fluid to be adjusted such that in one or more locations of the borehole the drilling fluid or other fluid includes the polymer having a certain percentage of the switchable-amphiphilic groups ionized and thus having a corresponding viscosity and other properties, while in one or more other locations of the borehole the drilling fluid or other fluid includes the polymer having a certain different percentage of the switchable-amphiphilic groups ionized and thus having a different corresponding viscosity and other properties. For example, during a drilling process, pressure can build up in the borehole due for example to penetration of the drill bit into a particular formation. The switchable-amphiphilic groups of the polymer can be ionized (e.g., downhole) such that the particles emulsify and increase the viscosity or density of the drilling fluid, thus timely preventing the increased pressure from causing a blowout or other undesirable consequences. In another example, during the drilling of porous material such as shale it can be desirable to prevent the influx of drilling fluid into the pores of the material to retain the stability of the material and thus of the stability of the borehole through the material. In some embodiments of the present invention, the viscosity of the drilling fluid proximate to the porous material can be increased to help prevent the influx of drilling fluid into the porous material, and thus preserve the integrity of the borehole.

The water-based drilling fluid in embodiments of the composition of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g. barium sulfate), surfactants (e.g. betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g. silica), pigments, dyes, precipitating agents (e.g., silicates or aluminum complexes), and rheology modifiers such as thickeners or viscosifiers (e.g. xanthan gum). Any ingredient listed in this paragraph can be either present or not present in the composition. The drilling fluid can be present in the composition in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the composition.

A pill is a relatively small quantity (e.g. less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

The composition can include an aqueous mixture of at least one of cement and cement kiln dust. The polymer can form a useful combination with cement or cement kiln dust, for example by modifying the viscosity or other properties of the cement at a desired time or in a desired place. For example, during the cementing phase of forming a well for petroleum extraction, some or parts of a particular borehole may require a thicker cement composition to allow the cement composition to properly set or to behave in another desired manner, while other parts of the borehole may not require as thick of a cement. A thicker cement can be more difficult to pump downhole. Various embodiments of the present invention allow for thickening of the cement or variation of other properties of the cement near or at the location where the thickened or otherwise modified material is desired. In another example, embodiments allow variation of the viscosity or other properties of the cement pumped downhole, such that a thicker or otherwise modified portion of cement can be placed downhole before, after, or between segments of cements having lower viscosity or other different properties. In another example, other properties of the cement near or at a desired location can be advantageously varied downhole or above the surface by ionizing a particular percentage of the switchable-amphiphilic groups using a particular ionizing agent or combination of ionizing agents.

The cement kiln dust can be any suitable cement kiln dust. Cement kiln dust can be formed during the manufacture of cement and can be partially calcined kiln feed which is removed from the gas stream and collected in a dust collector during manufacturing process. Cement kiln dust can be advantageously utilized in a cost-effective manner since kiln dust is often regarded as a low value waste product of the cement industry. Some embodiments of the composition can include cement kiln dust but no cement, cement kiln dust and cement, or cement but no cement kiln dust. The cement can be any suitable cement. The cement can be a hydraulic cement. A variety of cements can be utilized in accordance with the present invention, for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the composition in an amount sufficient to provide the desired compressive strength, density, or cost. In some embodiments, the hydraulic cement can be present in the composition in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

Monomer Having a Switchable-amphiphilic Functional Group.

In various embodiments, compositions and methods of the present invention include a polymer including a monomer having a switchable-amphiphilic functional group. The switchable-amphiphilic functional group is a functional group whose polarity can be switched to a more hydrophilic state, and switched back to a more hydrophobic state, wherein the switching between the more and less polar states can occur more than once. The switching can be caused by ionization and neutralization of the functional group, such as by acidification and coordination of the resulting ion to a counterion to generate a more polar functional group, or such as by liberation of a proton from an acidified functional group and corresponding disassociation of a coordinated counterion to generate a less polar functional group.

By switching the polarity of one or more switchable-amphiphilic functional groups in a polymer, the ability of the polymer to form an emulsion in various solvents, such as in an aqueous solution, can be affected. For example, by polarizing the switchable-amphiphilic functional group, the polymer can have a greater propensity for forming an emulsion in an aqueous solution. Likewise, by depolarizing or neutralizing the switchable-amphiphilic functional group, the polymer can have a lower propensity for forming an emulsion in an aqueous solution. The controllability of the polymer's propensity toward formation of an emulsion can be valuable and advantageous for a variety of applications in a variety of settings, as described further herein.

The monomer including the switchable-amphiphilic functional group can be added to a polymer via any suitable means. For example, a molecule including the switchable-amphiphilic functional group can include a functional group that can participate in a polymerization reaction. For example, a molecule including the switchable-amphiphilic functional group can include a vinyl group, and can be incorporated into the polymer via a free-radical polymerization with other monomers. The vinyl group of the molecule becomes a ethylidene group within the polymer, with the remainder of the molecule including the switchable-amphiphilic functional group substituted thereon. Thus, a monomer including the switchable-amphiphilic functional group can be derived in polymerization from a compound containing a vinyl group.

The switchable-amphiphilic functional group can be any suitable switchable-amphiphilic functional group. For example, the switchable-amphiphilic group can be a nitrogen-containing groups such as an amide, amine, or an amidine, an oxygen-containing group such as an ester, an amide, an amine, an oxygen-containing group such as a carboxylic acid or an ester, or a sulfur-containing group such as a thioester, thionoester, or a thioamide.

In some examples, the switchable-amphiphilic group can be

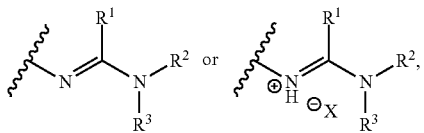

wherein $X^-$ is a counterion. The variables $R^1$, $R^2$, and $R^3$ independently at each occurrence can be selected from $(C_1-C_{10})$alkyl, $(C_2-C_{10})$alkenyl, $(C_2-C_{10})$alkynyl, $(C_1-C_{10})$haloalkyl, $(C_1-C_{10})$alkoxy, $(C_1-C_{10})$haloalkoxy, $(C_4-C_{10})$cycloalkyl$(C_0-C_{10})$alkyl, $(C_1-C_{10})$heterocyclyl$(C_0-C_{10})$alkyl, $(C_6-C_{10})$aryl$(C_0-C_{10})$alkyl, and $(C_1-C_{10})$heteroaryl$(C_0-C_{10})$alkyl. Each alkyl, alkenyl, alkynyl, haloalkyl, alkoxy, haloalkoxy, cycloalkyl, aryl, heterocyclyl, and heteroaryl is independently unsubstituted or further substituted with at least one J. The variable J independently at each occurrence can be selected from F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, C(O)$CH_2$C(O)R, C(S)R, C(O)OR, OC(O)R, OC(O)OR, C(O)N$(R)_2$, OC(O)N$(R)_2$, C(S)N$(R)_2$, $(CH_2)_{0-2}$NHC(O)R, N(R)N(R)C(O)R, N(R)N(R)C(O)OR, N(R)N(R)C(O)N$(R)_2$, N(R)$SO_2$R, N(R)$SO_2$N$(R)_2$, N(R)C(O)OR, N(R)C(O)R, N(R)C(S)R, N(R)C(O)N$(R)_2$, N(R)C(S)N$(R)_2$, N(C(O)R)C(O)R, N(OR)R, C(=NH)N$(R)_2$, C(O)N(OR)R, and C(=NOR)R. The variable R can be independently at each occurrence selected from hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J. In some embodiments, $R^1$, $R^2$, and $R^3$ can be independently at each occurrence $(C_1-C_5)$alkyl. In some embodiments, $R^1$, $R^2$, and $R^3$ can be methyl.

The positive charge in an ionized amidine structure represented as

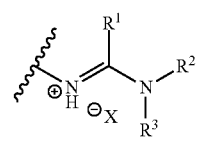

can be distributed across the nitrogen atoms. This can be represented by the resonance structures

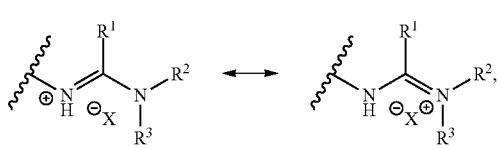

or by a single structure indicating a delocalized charge, for example:

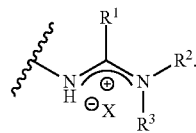

The counterion for an ionized switchable-amphiphilic group can be any suitable counterion. For example, in the amidine structure shown herein, $X^-$ can be a counterion bearing a $-1$ charge, such as a halide, such as fluoride, chloride, bromide, or iodide. In other examples, $X^-$ is nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion $X^-$ can be a conjugate base of any carboxylic acid, such as acetate or formate. In some embodiments, a counterion for a particular ionized switchable-amphiphilic group can be an anion having a negative charge greater than $-1$, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate. In various embodiments, $X^-$ is $HCO_3^-$.

The switchable-amphiphilic functional group can be connected to the polymer via one or more linking groups. For example, a molecule can include a vinyl group connected to a switchable-amphiphilic functional group via a linking group, such that after the vinyl group participates in the polymerization, the switchable-amphiphilic group is bound via the linking group to the resulting ethylidene group in the polymer backbone. In some examples, the monomer including the switchable-amphiphilic functional group is

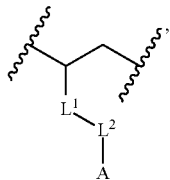

wherein linking group $L^1$ independently at each occurrence can be selected from a bond, O, S, C(O), S(O), methylenedioxy, ethylenedioxy, NR', SR'$_2$, SO$_2$R', SO$_2$NR', SO$_3$, C(O)C(O), C(O)CH$_2$C(O), C(S), C(O)O, OC(O), OC(O)O, C(O)NR', OC(O)NR', C(S)NR', (CH$_2$)$_{0-2}$NHC(O), N(R')N(R')C(O), N(R')N(R')C(O)O, N(R')N(R')C(O)NR', N(R')SO$_2$, N(R')SO$_2$NR', N(R')C(O)O, N(R')C(O), N(R')C(S), N(R')C(O)NR', N(R')C(S)NR', N(C(O)R')C(O), N(OR'), C(=NH)NR', C(O)N(OR'), and C(=NOR'). The variable R' can be independently at each occurrence selected from hydrogen, (C$_1$-C$_{10}$)alkyl, (C$_4$-C$_{10}$)cycloalkyl, (C$_4$-C$_{10}$)cycloalkyl(C$_1$-C$_{10}$)alkyl, (C$_6$-C$_{10}$)aryl, (C$_1$-C$_{10}$)aralkyl, (C$_1$-C$_{10}$)heterocyclyl, (C$_1$-C$_{10}$)heterocyclyl(C$_1$-C$_{10}$)alkyl, (C$_1$-C$_{10}$)heteroaryl, and (C$_1$-C$_{10}$)heteroaryl(C$_1$-C$_{10}$)alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J' Linking group $L^2$ independently at each occurrence can be selected from a bond, (C$_1$-C$_{30}$)alkylene, (C$_2$-C$_{30}$)alkenylene, (C$_2$-C$_{30}$)alkynylene, (C$_1$-C$_{30}$)haloalkylene, (C$_1$-C$_{30}$)alkoxylene, (C$_1$-C$_{30}$)haloalkoxylene, (C$_4$-C$_{30}$)cycloalkyl(C$_0$-C$_{30}$)alkylene, (C$_1$-C$_{30}$)heterocyclyl(C$_0$-C$_{30}$)alkylene, (C$_6$-C$_{30}$)aryl(C$_0$-C$_{30}$)alkylene, and (C$_1$-C$_{30}$)heteroaryl(C$_0$-C$_{30}$)alkylene; each alkylene, alkenylene, alkynylene, haloalkylene, haloalkoxylene, cycloalkylene, arylene, heterocyclylene, and heteroarylene can be independently unsubstituted or further substituted with at least one J'. In some embodiments, at least one of $L^1$ and $L^2$ is not a bond. The variable J' independently at each occurrence can be selected from F, Cl, Br, I, OR', CN, CF$_3$, OCF$_3$, R', O, S, C(O), S(O), methylenedioxy, ethylenedioxy, N(R')$_2$, SR', S(O)R', SO$_2$R', SO$_2$N(R')$_2$, SO$_3$R', C(O)R', C(O)C(O)R', C(O)CH$_2$C(O)R', C(S)R', C(O)OR', OC(O)R', OC(O)OR', C(O)N(R')$_2$, OC(O)N(R')$_2$, C(S)N(R')$_2$, (CH$_2$)$_{0-2}$NHC(O)R', N(R')N(R')C(O)R', N(R')N(R')C(O)OR', N(R')N(R')C(O)N(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(C(O)R')C(O)R', N(OR')R', C(=NH)N(R')$_2$, C(O)N(OR')R', and C(=NOR')R'. The variable A can be the switchable-amphiphilic functional group.

In some embodiments, $L^1$ can be selected from C(O), S(O), NH, SO$_2$NH, C(O)C(O), C(O)CH$_2$C(O), C(S), C(O)O, OC(O), OC(O)O, C(O)NH, OC(O)NH, C(S)NH, (CH$_2$)$_{0-2}$NHC(O), NHC(O)O, NHC(O), NHC(S), NHC(O)NH, and NHC(S)NH. In some examples, $L^1$ can be C(O)NH, wherein the C(O) group can be directly bound to the polymer backbone, and wherein the NH group can be directly bound to $L^2$. The polymer backbone can be the continuous portion of the polymer formed by the polymerized groups of the starting materials that reacted to form the polymer.

In various embodiments, $L^2$ can be selected from a bond, (C$_1$-C$_{30}$)alkylene, (C$_2$-C$_{30}$)alkenylene, (C$_2$-C$_{30}$)alkynylene, (C$_1$-C$_{30}$)haloalkylene, (C$_1$-C$_{30}$)alkoxylene, (C$_1$-C$_{30}$)haloalkoxylene, and (C$_4$-C$_{30}$)cycloalkyl(C$_0$-C$_{30}$)alkylene; wherein each alkylene, alkenylene, alkynylene, haloalkylene, alkoxylene, haloalkoxylene, and cycloalkylene is unsubstituted. For example, $L^2$ can be independently at each occurrence selected from (C$_5$-C$_{20}$)alkylene, (C$_5$-C$_{20}$)alkenylene, (C$_5$-C$_{20}$)alkynylene, and combinations thereof. For example, $L^2$ can be an unbranched C$_5$-C$_{20}$ alkanylene having no unsaturation, $L^2$ can be an unbranched C$_5$-C$_{20}$ hydrocarbon diradical having some unsaturation (e.g. having alkene groups therein), and $L^2$ can be a branched C$_5$-C$_{20}$ hydrocarbon diradical having alkene groups and alkyne groups therein in combination with unsaturated C—C bonds. In some examples, $L^2$ can be a dodecylene group.

The monomer including the switchable-amphiphilic functional group can be

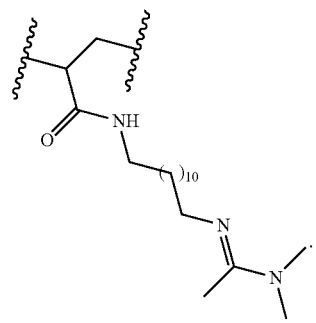

Polymer Including Monomer Having a Switchable-amphiphilic Functional Group.

In various embodiments, compositions and methods of the present invention include a polymer including a monomer including the switchable-amphiphilic functional group described herein. The polymer can be any suitable polymer. By virtue of at least the switchable-amphiphilic group in the polymer, the propensity of the polymer to form an emulsion in an aqueous solution can be modulated and controlled by subjecting the polymer to conditions to ionize one or more of the switchable-amphiphilic groups or to conditions to neutralize one or more of the switchable-amphiphilic groups in the polymer. An emulsion of the polymer can be a latex. In water the polymer can form thin fluids, emulsions, gels, or any combination thereof, depending on the structure of the monomer containing the switchable-amphiphilic groups or the structure of the other monomers, the proportion of switchable-amphiphilic groups that are ionized, and the type of ionizing agent or agents that are used to ionize the groups. In addition to the monomer having a switchable-amphiphilic functional group described herein, various embodiments of the polymer of the present invention can include other switchable-amphiphilic groups not described herein.

The polymer can be any suitable polymer. The polymer can form via any suitable polymerization reaction, such as condensation polymerization, addition polymerization, free-radical polymerization, ring-opening polymerization, cationic polymerization, anionic polymerization, coordination polymerization, and the like. In some embodiments, the polymer includes only monomers that include the switchable-amphiphilic functional group. In other embodiments, the polymer includes more than one monomer (e.g., copolymer), at least one of which does not include the switchable-amphiphilic functional group. The polymer can include any suitable number of different monomers, such as 2, 3, 4, 5, 6, 7 or more different monomers, for example with one or two different monomers including a switchable-amphiphilic functional group.

The molecule that reacts to form the monomer including the switchable-amphiphilic functional group includes a polymerizable group that can polymerize via the same or similar mechanism as the polymerizable groups possessed by the other starting materials that react to form the other monomer or monomers of the polymer chain. For example, the molecule that reacts to form the monomer including the switchable-amphiphilic functional group can include a vinyl group, and the other starting materials that form the polymer can also include a vinyl group, such that the vinyl groups can react via a free-radical polymerization to form the resulting polymer chain that includes the switchable-amphiphilic functional group. Therefore, the polymer can be classified as a polyvinyl polymer or a polyethylene polymer. In other examples, other types of functional groups on the starting materials and the molecule that reacts to form the monomer including the switchable-amphiphilic functional group can be used, such that the resulting polymer can be classified as a polyester, polyamide, polyurethane, polyurea, polysiloxane, polycarbonate, polysulfide, polyether, or phenol-formaldehyde.

In various embodiments, the polymer is a copolymer including at least two different monomers, wherein in addition to monomer $M^1$ including the switchable-amphiphilic functional group the polymer includes monomer $M^2$, wherein $M^2$ is derived from a compound including a vinyl functional group. In some embodiments, the polymer includes a monomer derived from styrene, $(C_1-C_5)$alkyl acrylate (e.g., methyl acrylate), $(C_1-C_5)$alkyl methacrylate (e.g. methyl methacrylate), acrylonitrile, butadiene, vinyl acetate, vinyl chloride, isoprene, dimethylsilane.

In various embodiments, the polymer can be a random copolymer having the following structure

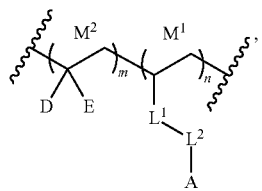

wherein monomers $M^1$ and $M^2$ have a random arrangement within the polymer. Monomers $M^1$ and $M^2$ independently at each occurrence can have the orientation shown or the opposite orientation. The variable E independently at each occurrence can be selected from hydrogen, F, Cl, Br, I, $(C_1-C_{10})$alkoxy, and $(C_1-C_{10})$alkyl. The variable D independently at each occurrence can be selected from Q, $(C_1-C_{10})$alkyl, $(C_2-C_{10})$alkenyl, $(C_2-C_{10})$alkynyl, $(C_1-C_{10})$haloalkyl, $(C_1-C_{10})$alkoxy, $(C_1-C_{10})$haloalkoxy, $(C_4-C_{10})$cycloalkyl$(C_0-C_{10})$alkyl, $(C_1-C_{10})$heterocyclyl$(C_0-C_{10})$alkyl, $(C_6-C_{10})$aryl$(C_0-C_{10})$alkyl, and $(C_1-C_{10})$heteroaryl$(C_0-C_{10})$alkyl; wherein each alkyl, alkenyl, alkynyl, haloalkyl, alkoxy, haloalkoxy, cycloalkyl, aryl, heterocyclyl, and heteroaryl can be independently unsubstituted or further substituted with at least one J". The variable Q independently at each occurrence can be selected from F, Cl, Br, I, OR", $CF_3$, $OCF_3$, R", CN, C(O), S(O), $N(R")_2$, SR", S(O)R", $SO_2R"$, $SO_2N(R")_2$, $SO_3R"$, C(O)R", C(O)C(O)R", $C(O)CH_2C(O)$R", C(S)R", C(O)OR", OC(O)R", OC(O)OR", $C(O)N(R")_2$, $OC(O)N(R")_2$, $C(S)N(R")_2$, $(CH_2)_{0-2}NHC(O)R"$, N(R")N(R")C(O)R", N(R")N(R")C(O)OR", N(R")N(R")C(O)N(R")_2$, $N(R")SO_2R"$, $N(R")SO_2N(R")_2$, N(R")C(O)OR", N(R")C(O)R", N(R")C(S)R", $N(R")C(O)N(R")_2$, N(R")C(S)N(R")_2$, $N(C(O)R")C(O)R"$, N(OR")R", C(=NH)N(R")_2$, and C(O)N(OR")R". The variable J" independently at each occurrence can be selected from F, Cl, Br, I, OR", CN, $CF_3$, $OCF_3$, R", O, S, C(O), S(O), methylenedioxy, ethylenedioxy, $N(R")_2$, SR", S(O)R", $SO_2R"$, $SO_2N(R")_2$, $SO_3R"$, C(O)R", C(O)C(O)R", $C(O)CH_2C(O)R"$, C(S)R", C(O)OR", OC(O)R", OC(O)OR", $C(O)N(R")_2$, $OC(O)N(R")_2$, $C(S)N(R")_2$, $(CH_2)_{0-2}NHC(O)R"$, N(R")N(R")C(O)R", N(R")N(R")C(O)OR", N(R")N(R")C(O)N(R")_2$, $N(R")SO_2R"$, $N(R")SO_2N(R")_2$, N(R")C(O)OR", N(R")C(O)R", N(R")C(S)R", N(R")C(O)N(R")_2$, N(R")C(S)N(R")_2$, $N(C(O)R")C(O)R"$, N(OR")R", C(=NH)N(R")_2$, N(C(O)N(R")_2$, and C(=NOR")R". The variable R" can be independently at each occurrence selected from hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl; each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J".

In some embodiments, in the random copolymer having at least monomers $M^1$ and $M^2$, the variable E independently at each occurrence can be selected from hydrogen and $(C_1-C_2)$alkyl. The variable D independently at each occurrence can be selected from CN, OC(O)R", C(O)OR", or $(C_6-C_{10})$aryl unsubstituted or further substituted with at least one J". The variable J" independently at each occurrence can be selected from F, Cl, Br, I, OR", CN, $CF_3$, $OCF_3$, R", O, S, C(O), S(O), methylenedioxy, ethylenedioxy, $N(R")_2$, SR", S(O)R", $SO_2R"$, $SO_2N(R")_2$, $SO_3R"$, C(O)R", C(O)C(O)R", $C(O)CH_2C(O)R"$, C(S)R", C(O)OR", OC(O)R", OC(O)OR", $C(O)N(R")_2$, $OC(O)N(R")_2$, $C(S)N(R")_2$, $(CH_2)_{0-2}NHC(O)R"$, N(R")N(R")C(O)R", N(R")N(R")C(O)OR", N(R")N(R")C(O)N(R")$_2$, N(R")SO$_2$R", N(R")SO$_2$N(R")$_2$, N(R")C(O)OR", N(R")C(O)R", N(R")C(S)R", N(R")C(O)N(R")$_2$, N(R")C(S)N(R")$_2$, N(C(O)R")C(O)R", N(OR")R", C(=NH)N(R")$_2$, C(O)N(OR")R", and C(=NOR")R". The variable R" can be independently at each occurrence selected from hydrogen, (C$_1$-C$_{10}$)alkyl, (C$_4$-C$_{10}$)cycloalkyl, (C$_4$-C$_{10}$)cycloalkyl(C$_1$-C$_{10}$)alkyl, (C$_6$-C$_{10}$)aryl, (C$_1$-C$_{10}$)aralkyl, (C$_1$-C$_{10}$)heterocyclyl, (C$_1$-C$_{10}$)heterocyclyl(C$_1$-C$_{10}$)alkyl, (C$_1$-C$_{10}$)heteroaryl, and (C$_1$-C$_{10}$)heteroaryl(C$_1$-C$_{10}$)alkyl; each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J".

In some embodiments, in the random copolymer having at least monomers M$^1$ and M$^2$, the variable E independently at each occurrence can be selected from hydrogen and (C$_1$-C$_2$)alkyl. The variable D independently at each occurrence can be selected from CN, OC(O)R", C(O)OR", and (C$_6$-C$_{10}$)aryl. The variable R" can be independently at each occurrence (C$_1$-C$_5$)alkyl.

In some embodiments, the polymer can have the following structure:

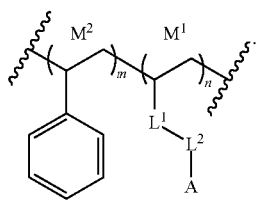

In various embodiments, in a polymer having n units of monomer M$^1$ including the switchable-amphiphilic functional groups and m units of other monomer M$^2$, (n/(n+m))*100 can be about 0.001-20, 0.01-10, or about 0.10-5. In some examples, the polymer includes other monomers aside from M$^1$ and M$^2$; in other examples, the polymer only includes monomers M$^1$ and M$^2$. In various embodiments, the polymer can have a mole percent of the monomer including the switchable-amphiphilic functional group of about 0.001%-20%, 0.01%-10%, or about 0.10%-5%.

In some examples, the polymer can have a degree of polymerization of about 10 to about 10,000,000, or about 50 to about 1,000,000, or about 100-300,000. The polymer can have a molecular weight of about 10-150,000,000 g/mol, 50-50,000,000 g/mol, or about 100-10,000,000 g/mol. The polymer can form particles having an average diameter of any suitable size, such as about 10 nm-1000 nm, 15 nm-500 nm, 20 nm-300 nm, or about 20 nm-200 nm. The particles can coalesce when the switchable-amphiphilic functional groups are neutralized, and the particles can form an emulsion when the switchable-amphiphilic functional groups are ionized.

Method of Preparing a Composition Including the Polymer.

In some embodiments, the present invention provides a method for preparing an composition including at least one of a drilling fluid, stimulation fluid, fracking fluid, spotting fluid, clean-up fluid, production fluid, completion fluid, remedial treatment fluid, abandonment fluid, pill, acidizing fluid, and a cementing fluid, wherein the composition can be aqueous. In some examples, the composition is an aqueous pill, aqueous drilling fluid or an aqueous mixture including at least one of cement and cement kiln dust. The method includes obtaining or providing the polymer having switchable-amphiphilic groups described herein. The polymer can be obtained or provided in any suitable manner, including via chemical synthesis or via purchasing. The method also includes combining the polymer with at least one of a drilling fluid, stimulation fluid, fracking fluid, spotting fluid, clean-up fluid, production fluid, completion fluid, remedial treatment fluid, abandonment fluid, pill, acidizing fluid, and a cementing fluid. The combining can be conducted in any suitable fashion.

The monomers can be obtained commercially or can by synthesized in any suitable manner. Chemical synthesis of the polymer can occur in any suitable manner. For example, the starting materials for the polymer can be combined and allowed to react under conditions sufficient for the polymerization to occur. The polymerization can be conducted with or without one or more polymerization initiators. For example, the conditions can include heating at about 10-300° C., or about 20-200° C., or about 30-100° C., for about 0.1 h-5 d, or about 1 h-24 h, or about 2 h-12 h. In some examples, the polymerization is an emulsion polymerization, wherein the polymerization occurs in an emulsion including water, monomer, and surfactant. The monomer including the switchable-amphiphilic group can serve as the surfactant.

EXAMPLES

The present invention can be better understood by reference to the following examples which are offered by way of illustration. The present invention is not limited to the examples given herein.

At least some of the below Examples appear in Zhang, Q. et al., *Langmuir* 2012, 28, 2940-2946.

General. 1,12-Diaminododecane, N,N-dimethylacetamide dimethyl acetal (98%), and 2,2-azobis[2-(2-imidazolin-2-yl)propane] (VA-061) were supplied by Acros and were used without further purification. Boc anhydride, acryloyl chloride, and trifluoroacetic acid (TFA) were supplied by Aladdin-Reagent Co. Other chemicals were analytical-grade reagents and were used as received. All aqueous solutions were prepared with deionized (DI) water. Carbon dioxide (dry ice grade) and nitrogen (99.999%) were purchased from Jingong Air Co. Styrene was distilled under vacuum prior to use. The initiator solution was prepared by bubbling carbon dioxide through 2,2'-azobis[2-(2-imidazolin-2-yl)propane] (0.875 g, 3.5 mmol) in water (20 g) until the aqueous solution became transparent.

Example 1

Synthesis of N-Boc-1,12-diaminododecane (1)

1,12-Diaminododecane (10.02 g, 50 mmol) was dissolved in CHCl$_3$ (200 mL). Boc anhydride (2.18 g, 10 mmol) was dissolved separately in CHCl$_3$ (50 mL), and this solution was then added dropwise to the diamine solution. The resulting mixture was stirred overnight. After filtration, the filtrate was concentrated, adsorbed onto SiO$_2$, and purified by flash column chromatography (SiO$_2$) eluting with 6% MeOH/dichloromethane to obtain pure mono-Boc-protected diamine 1 after drying in vacuo (2.34 g, 78%).

Example 2

Synthesis of (N-Boc-amido)dodecyl Acrylamide (2)

N-Boc-1,12-diaminododecane (1.44 g, 4.8 mmol) and Et$_3$N (1 mL, 7 mmol) were dissolved in CHCl$_3$ (20 mL).

Acrylyl chloride (0.5 mL, 5.8 mmol) was added dropwise, while temperature was kept at 0-5° C. After being stirred for 4 h at room temperature, the reaction was stopped. The mixture was washed with 1 M HCl solution, 1 M NaOH solution, and DI water successively. The organic layer was collected and was dried over anhydrous $Na_2SO_4$. After removal of $Na_2SO_4$, the solvent was evaporated to obtain 2 (1.67 g, 98%) as a white solid.

Example 3

Synthesis of (N-Amido)dodecyl Acrylamide.TFA (3)

(N-Bocamido) dodecyl acrylamide (1.67 g, 4.7 mmol) was dissolved in ethanol (10 mL). After TFA addition (10 equiv), the mixture was left to stir overnight at room temperature. The solvent and excess TFA were removed by a rotation evaporator; crude product was then purified by recrystallization in ether to obtain white solid 3 (1.56 g, 90%).

Example 4

Synthesis of (N-Amidino)dodecyl Acrylamide (DAm)

The amine TFA salt 3 (1.36 g, 3.7 mmol) was dispersed in $CHCl_3$ (10 mL), and washed with 1 M NaOH solution (5 mL) and DI water (5 mL), successively. The organic layer was collected and was dried over anhydrous $Na_2SO_4$. After removal of $Na_2SO_4$, the solvent was evaporated. 2 M dimethyl amine (8 mL) and dimethylacetamide dimethyl acetal (0.53 g, 4 mmol) were added, and the reaction mixture was stirred for 18 h in the dark. The product was obtained by drying under vacuum. Determined gravimetrically, the amidine yield was nearly quantitative. A higher purity sample was obtained by bubbling $CO_2$ for 60 min through a wet acetonitrile mixture solution to collect the white solid. The solid was again dissolved in a small quantity of acetonitrile and then bubbled with $N_2$ to recover the deionized structure. Finally, the solvent was removed, and the endproduct was dried (1.06 g, 89%).

$^1$H NMR (400 MHz, $CDCl_3$, δ): 6.21 (d, J=17.0 Hz, 1H), 6.10 (q, 1H), 5.56 (d, J=10.2 Hz, 1H), 3.28 (t, J=7.1 Hz, 2H), 3.17 (t, J=7.5 Hz, 2H), 2.89 (s, 6H), 1.49 (s, 3H), 1.23-1.27 (m, 20H). MS (ESI, m/z): $[M+H]^+$ calcd for $C_{19}H_{38}N_3O$, 324.52. Found, 324.1.

Figure 2:
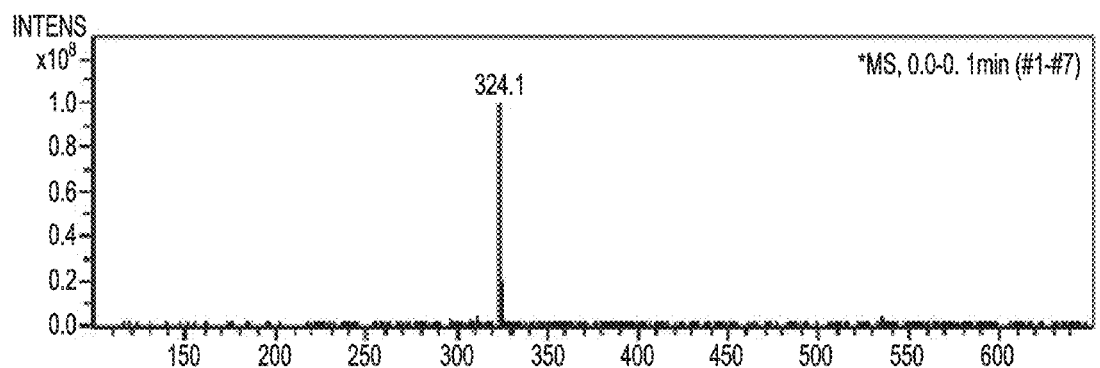
FIG. 2 illustrates the ESI mass spectrum of DAm, according to various embodiments.

FIG. 1 shows the $^1$H NMR spectrum of DAm in $CDCl_3$. FIG. 2 shows the MS-ESI spectrum of DAm.

Example 5

Synthesis of (N-Amidino)dodecyl Acrylamide Hydrochloride Salt (DAm.HCl)

The hydrochloride salt of DAm was obtained by recrystallization in 1 M HCl solution. The white solid was dried in vacuum to constant weight. Scheme 1 summarizes the synthesis of the switchable amidine surfactant.

Scheme 1. Synthetic route to switchable reactive surfactact DAm.

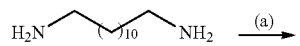

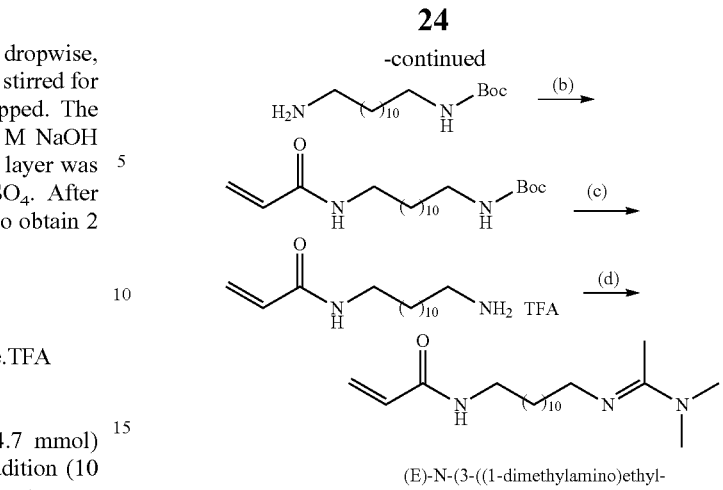

(E)-N-(3-((1-dimethylamino)ethylidene)amino)dodecyl)acrylamide (DAm)

(a) $(Boc)_2O/CHCl_3$, room temperature overnight; (b) $CH_2$=CHCOCl, $Et_3N/CHCl_3$; (c) $CF_3COOH/EtOH$, room temperature 8 h; (d) N,N-dimethyl acetamide dimethyl acetal, $Et_3N/CHCl_3$, 65° C., 0.5 h.

Example 6

Preparation of Polystyrene Latexes

Styrene ("St", 4.55 g) and DAm (0.075-0.25 g) were added to a 50 mL three-necked flask that contained 18 g of DI water. The mixture was agitated at 500 rpm and was purged with $CO_2$ for 30 min. The initiator solution was prepared by bubbling $CO_2$ through an aqueous solution of 2,2'-azobis[2-(2-imidazolin-2-yl)propane] (87 mg in 2 g of water) until it was well dissolved. The initiator solution was added to the reactor by a syringe. The mixture was quickly heated to 55° C. at 300 rpm. The polymerization was conducted for 6 h. The monomer conversion was determined gravimetrically. The freeze-dried latex samples were prepared for GPC and NMR measurements.

Example 7

Latex Coagulation and Redispersion

The latex (2 g) was heated to 60° C. with bubbling $N_2$. Once gel formation was observed, additional water (1 mL) was added to facilitate separation, yielding suspension. The suspension was further treated by bubbling $N_2$ with heating for 1 h. The polymer particles were left to settle under gravity. Centrifugation was used to accelerate the separation of coagulated particles from the solution. To redisperse the coagulated PS particles into the same solution, the mixture was bubbled with $CO_2$ for several minutes, followed by ultrasonication. The bubbling and ultrasonication processes were repeated three to four times until a stable latex was obtained.

Example 8

Characterizations $^1$H and $^{13}$C NMR spectra were acquired in a Bruker Advance 2B 400 MHz spectrometer. ESI/MS measurement was conducted using a Finnigan LCQ DECA XPplus instrument (150-2000 m/z). The critical micelle concentration (CMC) of DAm.HCl was determined at 25.5±0.1° C. by surface tension measurement on aqueous solution (OCA20

Video-based Contact Angle Measuring Device). The conductivity of DAm in DMSO was measured using a Lei-ci conductivity meter DDSJ-308A at 25±0.2° C. Prior to the conductivity measurement, the solution was bubbled with $N_2$ for 1 h until a stable conductivity was reached. The particle size and distribution were determined by a Malvern Zetasizer 3000HSA (670 nm, 3 mW, 90° scattering angle) at 25° C. The particle morphology was visualized using a JEM-1200EX TEM.

Example 9

Results and Discussion

Example 9A

Characterization of Switchable Reactive Surfactant DAm

Figure 3:
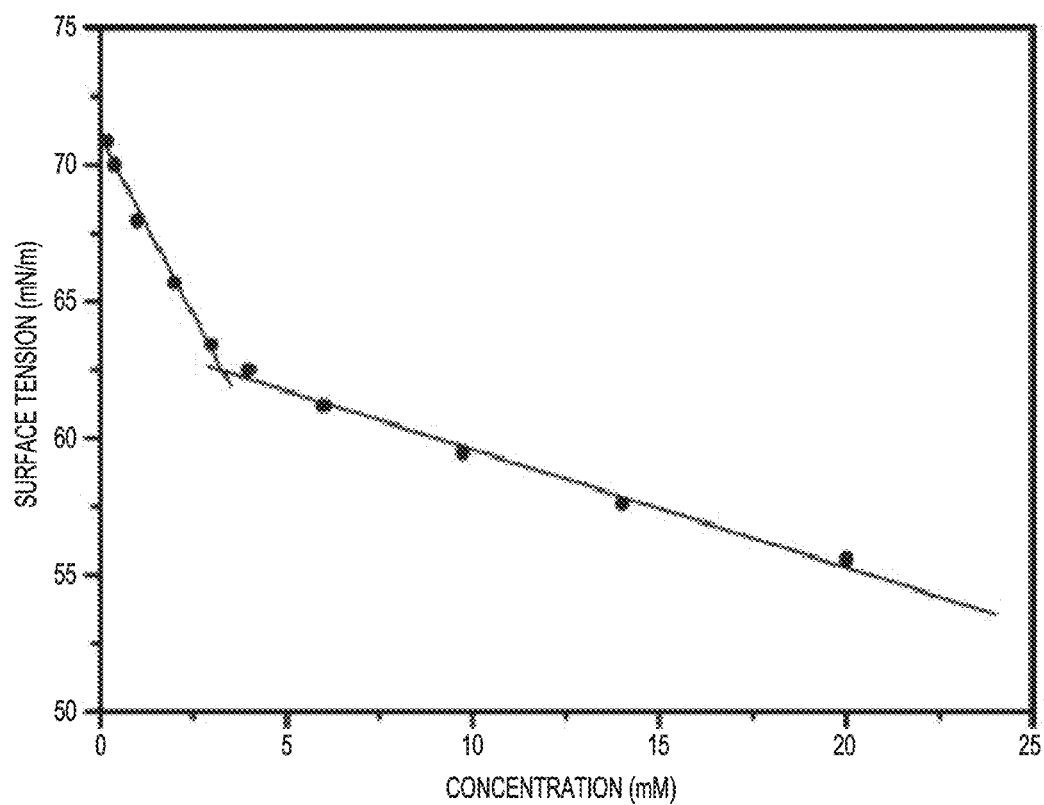
FIG. 3 illustrates the surface tension versus DAmHCl concentration in aqueous solutions at 25.5+/−0.1° C., according to various embodiments.

The surface activity of DAm was first investigated. The critical micelle concentration (CMC) value of DAm.HCl was determined from the breakpoint of the plot of surface tension versus concentration of their aqueous solutions at 25.5° C., as shown in FIG. 3. The surface excess concentration ($\Gamma$) and the area per surfactant molecule ($\alpha_s$) at the air/water surface were estimated according to Rosen, M. J. *Surfactants and Interfacial Phenomena*, 3$^{rd}$ ed.; Wiley: Hoboken, N.J., 2004. Table 1 lists the results of CMC value and $\alpha_s$ of DAm.HCl.

TABLE 1

Comparison of CMC and $\alpha_s$ values of three surfactants, wherein $\gamma_{CMC}$ designates the surface tension at the CMC, see Aydogan, N.; Abbott, N. L., *Langmuir* 2001, 17, 5703-5706.

| | CMC, mM | $\gamma_{CMC}$,[a] mN/m | $\Gamma$, mol/cm$^2$ | $\alpha_s$, nm$^2$ |
|---|---|---|---|---|
|  | 3.3 | 62.5 | $8.1 \times 10^{-10}$ | 0.21 |
| [b] | 2.2 | 29 | $2.6 \times 10^{-10}$ | 0.64 |
| [b] | 0.5 | 35 | $2.5 \times 10^{-10}$ | 0.65 |

As compared to the other two surfactants, the synthesized amidinium appeared to have a higher CMC value and a smaller molecule area. For an ionic surfactant, smaller $\alpha_s$ means higher charge density on latex particle surface, leading to better emulsion stability.

Figure 4:
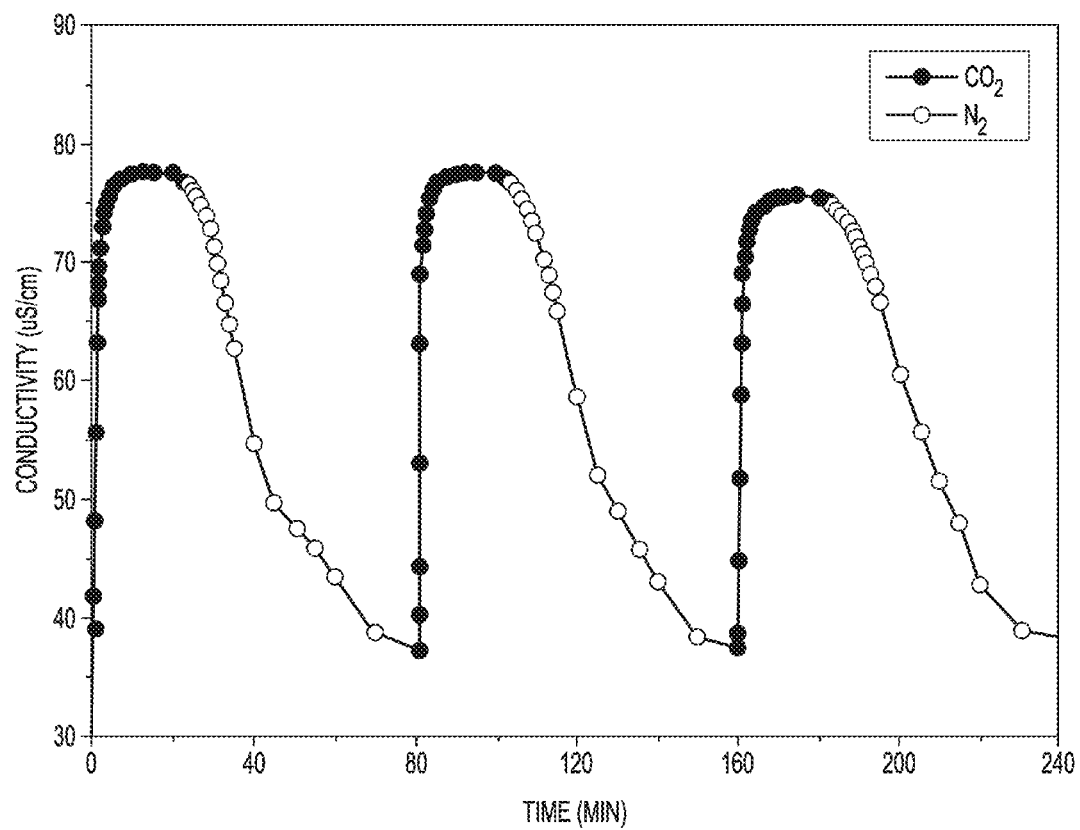
FIG. 4 illustrates variation of the conductivity of DAm in DMSO solution (10 mM) at 25° C. versus time during three cycles of alternatively bubbling $CO_2$ and $N_2$, according to various embodiments.

The switchability of DAm was monitored by conductivity tests. The conductivity of 10 mM of DAm in dimethyl sulfoxide (DMSO) was determined at 25±0.2° C. for three cycles of alternated bubbling $CO_2$ or $N_2$. FIG. 4 shows the results. The conductivity of the solution increased from 37.4 to 77.6 μS/cm in 15 min and leveled off when $CO_2$ was bubbled. It reduced to its initial value in 65 min upon bubbling with $N_2$. The successive cycles gave similar conductivity data, which showed good reversibility and repeatability of the amidine. Switchability of DAm by use of $CO_2$ and $N_2$ bubbling is demonstrated.

Example 9B

Polystyrene Latexes by Emulsion Polymerization of Styrene with DAm

Figure 5:
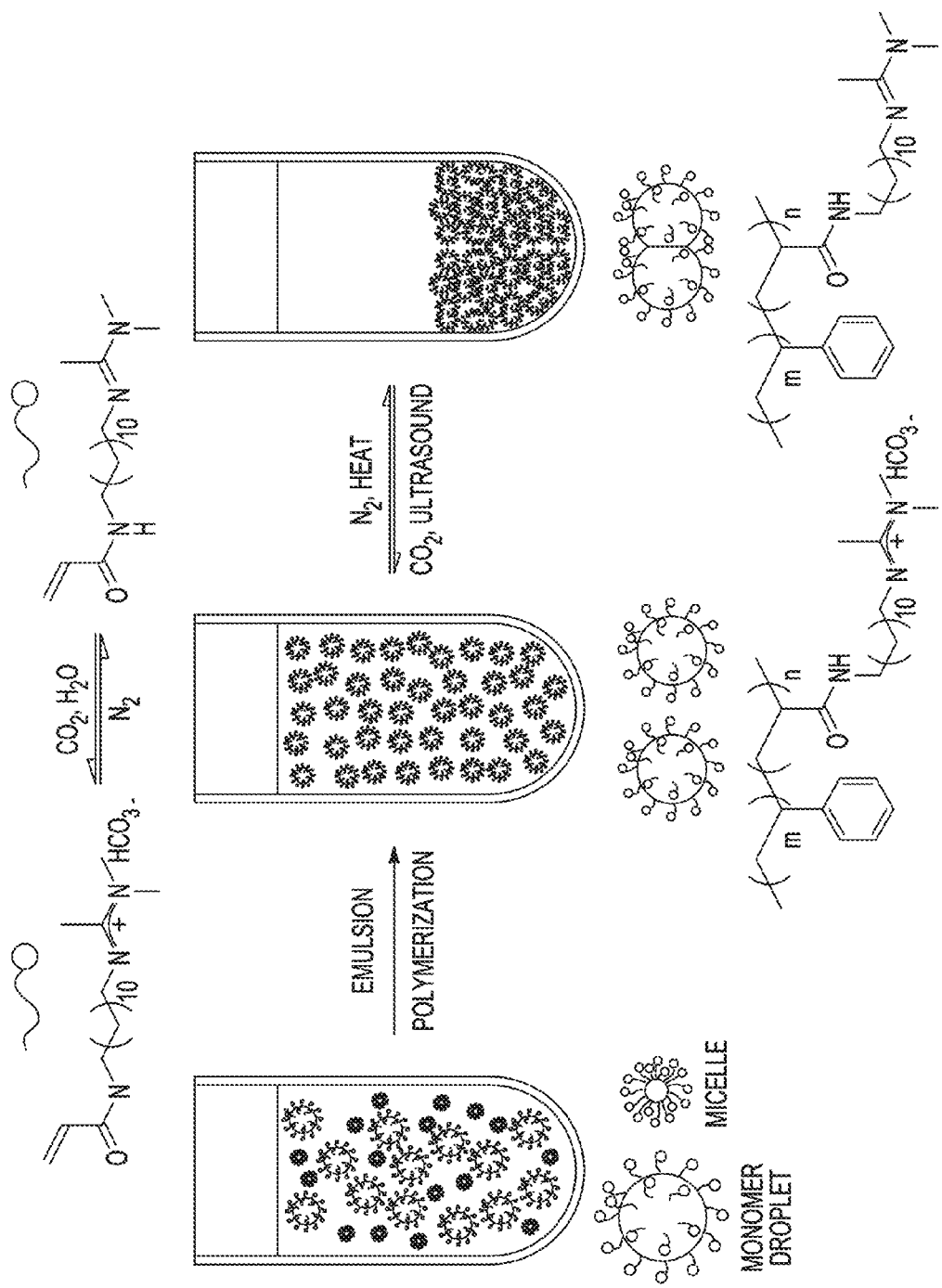
FIG. 5 illustrates an $N_2/CO_2$ triggered switchable reactive surfactant DAm and reversibly coagulatable and redispersible monomer and polystyrene latex prepared therefrom, in accordance with various embodiments.

After the surface activity and switchability of the surfactant were confirmed, the cationic groups of DAm were introduced onto particle surfaces to stabilize the emulsion. DAm acted as surfactant for micellar nucleation, and also acted as comonomer for unwashable stabilizer. See, FIG. 5.

DAm 0.3-1.8 mol % (equivalent to 0.9-5.6 wt %) was used in the emulsion polymerization experiments, which were initiated by VA-061 and carried out under $CO_2$ atmosphere at 55° C. for 6 h. Table 2 summarizes the experimental conditions, as well as the data of monomer conversion, amidine hydrolysis, polymer composition, and particle size. The amidinium surfactant effectively stabilized the emulsion in all runs. Stable PS latexes were obtained with little coagulum. The samples were stored under $CO_2$ atmosphere at room temperature for more than 3 months without any observable separation. The overall monomer conversions were between 89% and 95%. $^1$H NMR measurements of the resulted latex samples were used to estimate the percentage of amidine hydrolysis and molar ratio of amidine copolymerized with St. The samples were prepared by freeze-drying. As DAm has a high boiling point, only unreacted St and water contents were removed, but the unreacted DAm should remain, if any. There were no residual vinyl groups determined at the chemical shifts of 6.21, 6.10, and 5.56 ppm, suggesting substantially complete reaction of DAm during the polymerization.

TABLE 2

Experimental conditions and results from the emulsion polymerization of styrene with switchable reactive surfactant DAm.

| Run | [DAm]/[St] × $10^2$ | X [%][b] | Coag. [%] | Hydrolysis [%][c] | $F_{ad} \times 10^{2d}$ | $F_{ad} \times 10^{2e}$ | $N_p[10^{17}$/L] | $D_z$ [nm] |
|---|---|---|---|---|---|---|---|---|
| E1 | 0.3 | 89.0 | 3.7 | 18 | 0.28 | 0.42 | 0.92 | 157.5 |
| E2 | 0.6 | 90.1 | 0.0 | 14 | 0.57 | 0.59 | 1.75 | 126.6 |
| E3 | 0.9 | 93.1 | 4.9 | 19 | 0.78 | 0.65 | 2.68 | 110.8 |
| E4 | 1.2 | 93.3 | 0.8 | 11 | 1.14 | 1.13 | 3.60 | 100.0 |
| E5 | 1.5 | 94.3 | 2.8 | 11 | 1.42 | 1.43 | 4.75 | 90.5 |
| E6 | 1.8 | 95.1 | 2.2 | 15 | 1.61 | 1.51 | 6.66 | 78.9 |

In Table 2:
[a]All runs contained 4.55 g of St and 20 g of water, and were varied out at 55° C. and 300 rpm for 6 h under CO2 atmosphere; initiator is 2,2'-azobis[2-(2-imidazolin-2-yl)propane] (0.8 mol % of St for each run);
[b]total monomer conversion determined gravimetrically;
[c]percentage of amidine hydrolysis during emulsion polymerization as measured by $^1$H NMR;
[d]the molar ratio of switchable amidine incorporated with polystyrene as estimated from the conversion results;
[e]the molar ratio of switchable amidine incorporated with polystyrene as determined by $^1$H NMR.

Figure 6:
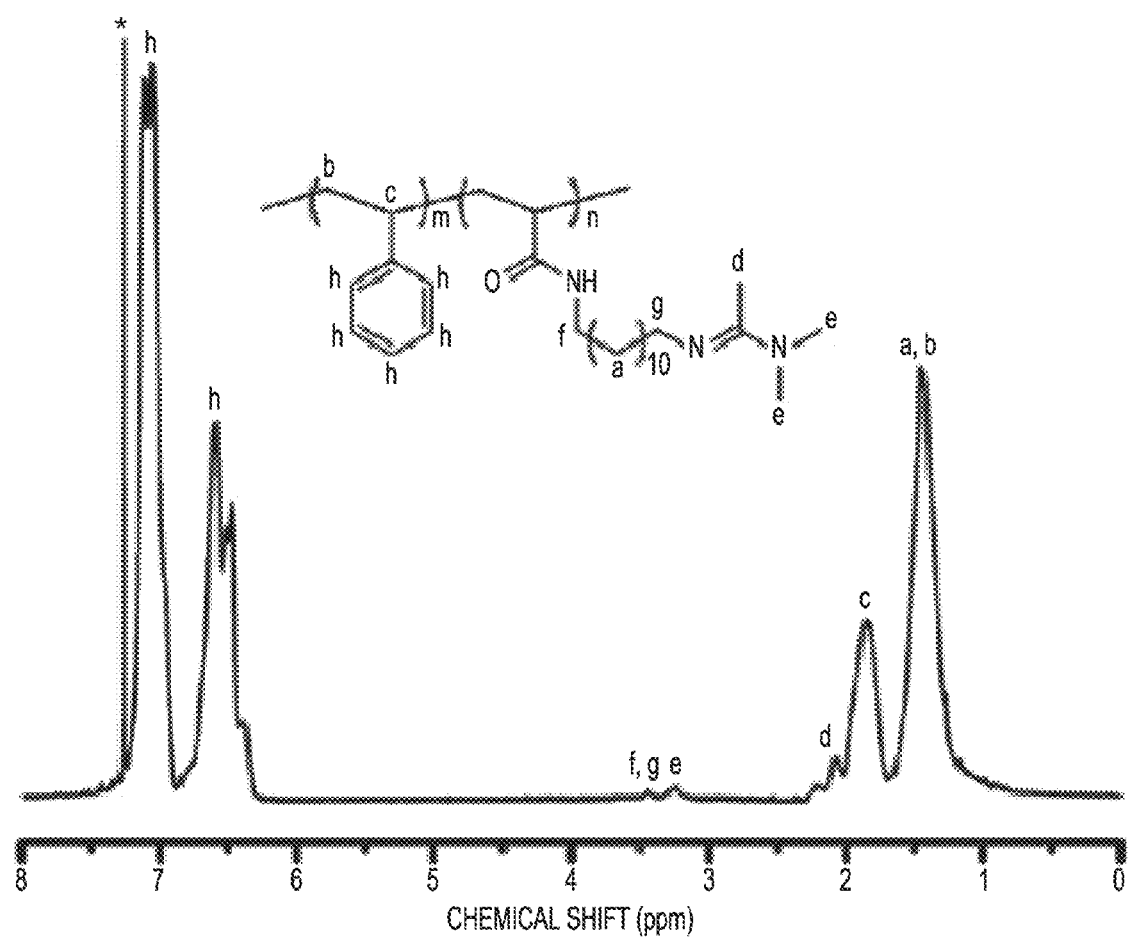
FIG. 6 illustrates the $^1$H NMR spectrum of run E3 polymer sample, in accordance with various embodiments.

Amidine groups are substantially stable under acidic conditions, and they can be hydrolyzed under basic conditions. NMR measurements were used to examine the hydrolysis of DAm during polymerization. FIG. 6 shows a representative $^1$H NMR spectrum from the run E3 polymer sample. While the integration of the peaks at 3.43 ppm was calibrated to 4 to represent the f and g protons, the integration of the e protons at 3.24 ppm was found to be 4.86, which was supposed to be 6 if there was no amidine hydrolysis. The percentage of hydrolyzed amidine during emulsion polymerization was 19% (1−4.86/6=0.19) in run E3. The amidine hydrolysis percentages in other runs were between 11% and 19%. An analysis of $^1$H NMR spectra also revealed that the molar fractions of the switchable amidine in the polymer samples after freeze-drying were between 0.42 and 1.51 mol %, agreeing with the data estimated from the conversion data. Run E4 was further treated by three cycles of tetrahydrofuran dissolution and methanol precipitation to remove water-soluble oligomer formed by DAm in the latex. The $^1$H NMR measurement showed the DAm amount in the treated polymer sample was 17% less than the freeze-dried sample, suggesting that 17% DAm was homopolymerized while 83% was incorporated into the copolymer with styrene during emulsion polymerization. The polymer particles had a Z-average diameter ($D_z$) between 78.9 and 157.5 nm, and there were (0.85-6.74)×$10^{17}$ PS particles per liter of latex.

The effects of surfactant concentration on monomer conversion, particle size, and number of particles ($N_p$) were examined With an increase in the DAm concentration, the total monomer conversion increased from 89% to 95% and the particle size decreased from 157.5 to 78.9 nm, while the $N_p$ increased from 0.85×$10^{17}$ to 6.74×$10^{17}$ L$^{-1}$. The surfactant concentration dependence of monomer conversion, particle size, and $N_p$ can be characteristic of batch emulsion polymerization with micellar nucleation.

Example 9C

Reversible Coagulation and Redispersion of Latexes

The vinyl-containing DAm copolymerized with St during emulsion polymerization, and thus the amidine functional groups were incorporated onto the latex particles. 2,2'-Azobis[2-(2-imidazolin-2-yl)propane], was used as a switchable initiator to provide an additional source of switchability, see Fowler, C. L. et al., *Macromolecules* 2011, 44, 2501-2509. The initiator amount was 0.8 mol % of St. Because of its low initiator efficiency (typically 2-10%), there was less than 0.08 mol % 2,2'-azobis[2-(2-imidazolin-2-yl)propane] attached to polymer chains, which was far lower than the molar ratio of DAm in the polymer (0.42-1.51 mol %). The latex switchability was mainly contributed by the reactive switchable surfactant DAm. Because DAm could be readily switched between charge and neutral forms by purging with $CO_2$ and $N_2$, the switchability of the PS latexes was also examined with $N_2$ and $CO_2$.

Figure 7:
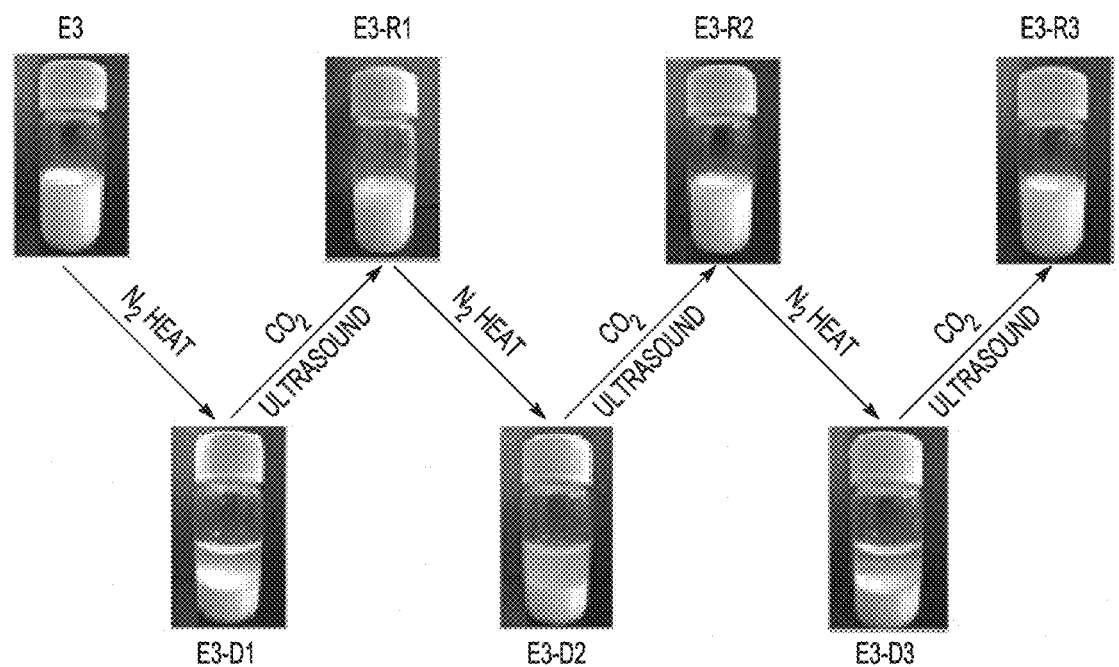
FIG. 7 illustrates three cycles of latex coagulation by bubbling $N_2$ with heating (E3-D1-D3-D3) and redispersion of the coagulated particles with $CO_2$ bubbling (E3-R1-E3-R3) for run E3 sample, in accordance with various embodiments.
Figure 8A:
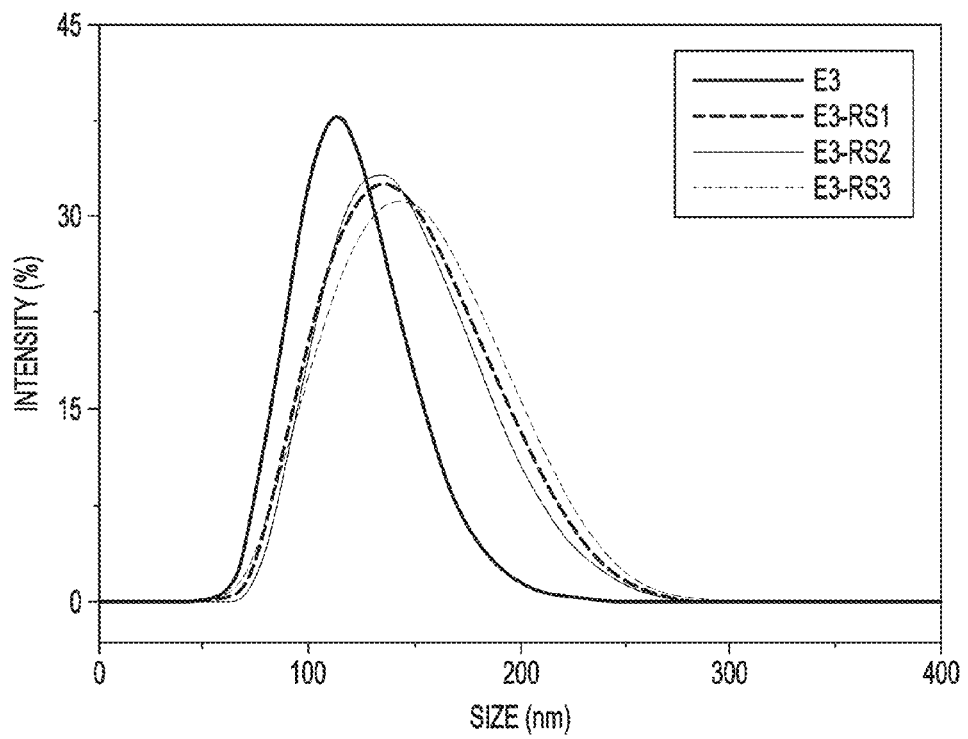
FIGS. 8a-d illustrate particle size distributions for polystyrene latex samples and their redispersed formed with three cycles of coagulation and redispersion, runs E3, E4, E5, and E6, respectively, in accordance with various embodiments.
Figure 8B:
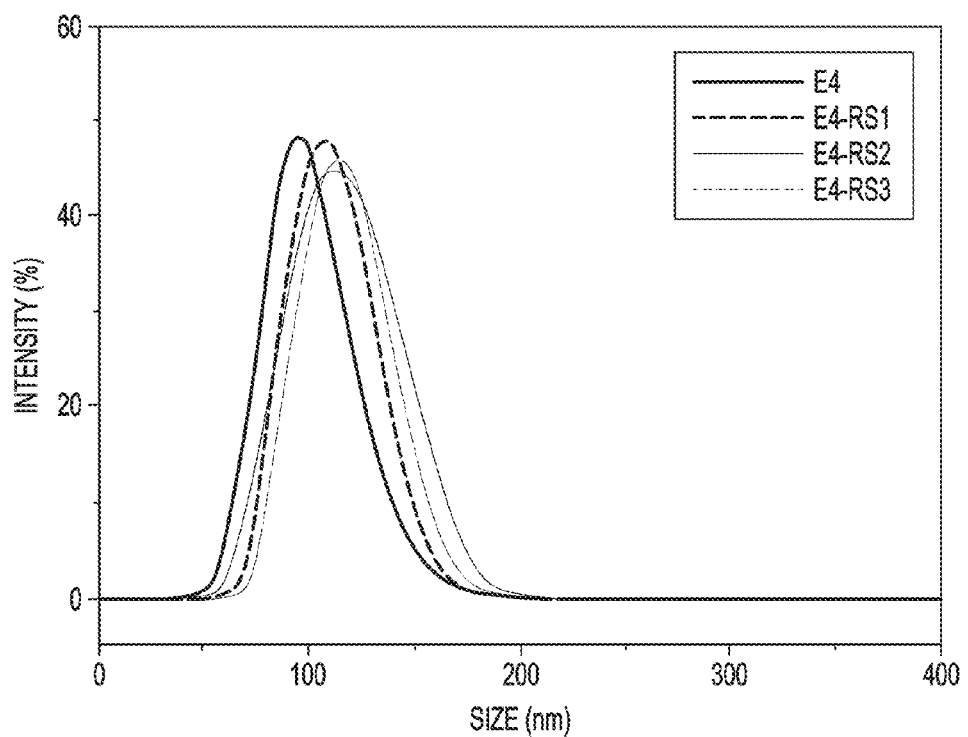
Figure 8C:
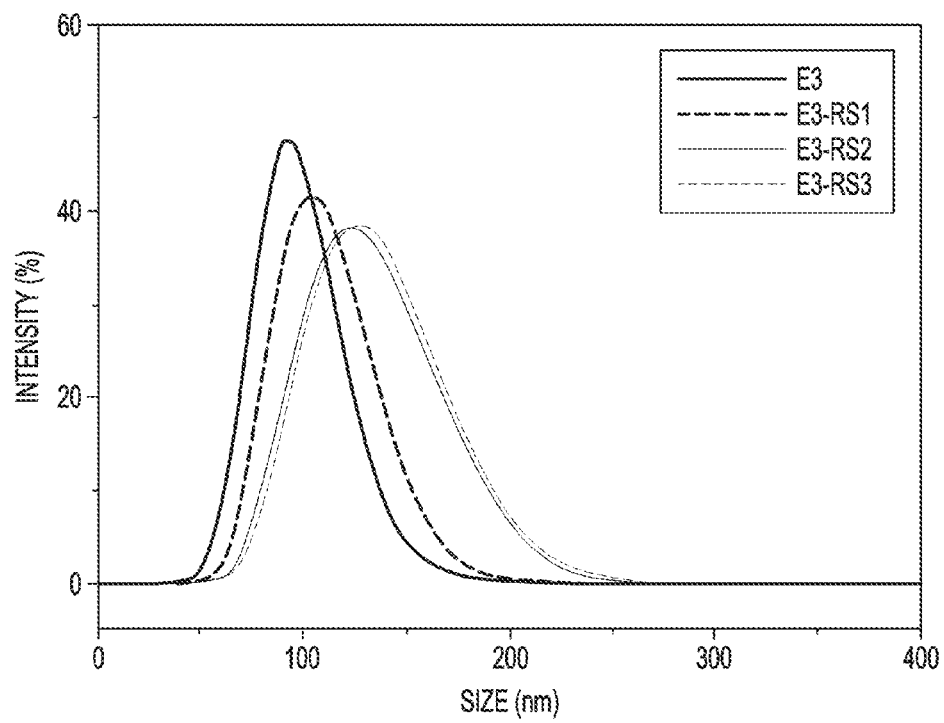
Figure 8D:
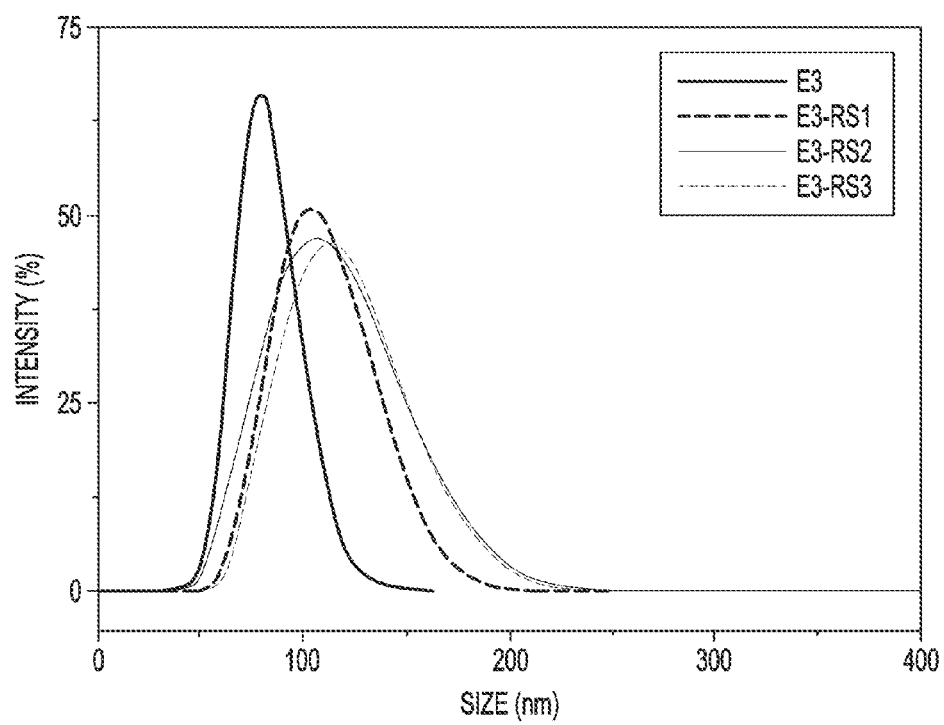

The reaction of converting amidinum bicarbonate to amidine is endothermic. Elevating temperature helps increase particle encounters, thus prompting particle aggregation. Therefore, the coagulation process was performed by heating 2.0 g of the latex at 60° C. with continuously bubbling $N_2$. In destabilizing run E3-E6 samples, the latexes experienced gel formation, which occurred in 30-60 min. The higher was the amidine concentration, the shorter was the time of gel formation. For run E5 and E6 samples that had the highest amidine contents, the gel formation occurred so fast that the systems could not be stirred easily. Once gel formation was observed, an additional 1 mL of water was added to facilitate separation, giving a suspension. The suspension was further treated by bubbling $N_2$ with heating for another hour. The latex particles were left to settle under gravity. Use of centrifugation could accelerate the separation of coagulated particles from solution. FIG. 7 shows a typical example of run E3 latex sample. The other samples (runs E4-6) had similar performances in coagulation. However, the samples having lower amidine concentrations (runs E1 and E2) did not have gel formation even by extending heating to 2 h or elevating temperature to 70° C. The ease of latex coagulation depended on the amount of amidine functionality. Because of their incomplete destabilization, run E1 and E2 samples were not chosen for redispersion studies.

The coagulated particles were redispersed to the same solution by bubbling $CO_2$ followed by ultrasonication three to four times. The coagulated PS particles were well dispersed and restabilized. Stable latex emulsions had a slightly bluish appearance after redispersion. The coagulation and redispersion processes were repeated for three cycles with the run E3 sample. All of the repeats had the same observation as the first cycle. FIG. 7 also shows the images in the three cycles of coagulation and redispersion processes. Their particle size distributions were determined by Malvern Particle Sizer as shown in FIG. 8. Although it increased about 20 nm after the first cycle, the average particle size changed little in the successive cycles. The particle size measurement gave similar monomodal distributions for E3-R1 to E3-R3, without large aggregates observed.

As compared to the original latex, the particle size distribution experienced a small shift toward the larger size end and also appeared a little wider. The included TEM images strongly supported the DLS results. Almost all of the particles in the original latex sample were nicely isolated from each other with little aggregation. However, the redispersed latex samples had a few small clusters of particles, although no microscale large aggregates were present. Run E4-6 latex samples were also thoroughly investigated for their coagulatability and redispersibility, and all of the measurements gave consistently good results as run E3. Their particle size distributions are shown in FIG. 8. Tables 3a-3c summarize the Z-average particle size and the number of particles per liter of latex for runs E3-E6 and their recovered latex samples. The $N_p$ values were calculated from the latex particle size distributions. The particle volume ratios of redispersed latex to its original sample, $(D_z/D_{z0})^3$, are also presented in the table. All of the runs had $N_p$ between 1.8 and $6.7 \times 10^{17}$ particles per liter of latex. After three-cycle coagulation and redispersion, Dz increased by 10-39% and $N_p$ decreased 31-59%, while the $(D_z/D_{z0})^3$ were 1.14-2.69. These changes in Dz and Np were caused by a few small clusters, which was also shown as $(D_z/D_{z0})^3 > 1$.

TABLE 3a

Z-Average particle size ($D_z$ [nm]) before and after each cycle of coagulation and redispersion.

| Run | Original | RS1 | RS2 | RS3 |
|---|---|---|---|---|
| E3 | 110.8 ± 3.6 | 131.7 ± 2.4 | 132.4 ± 6.7 | 131.4 ± 4.0 |
| E4 | 100.0 ± 3.2 | 104.4 ± 1.0 | 107.7 ± 0.5 | 110.3 ± 1.6 |
| E5 | 90.5 ± 4.0 | 108.3 ± 3.8 | 113.7 ± 9.8 | 111.6 ± 0.5 |
| E6 | 78.9 ± 3.7 | 104.2 ± 5.3 | 104.8 ± 0.7 | 109.7 ± 1.0 |

TABLE 3b

Number of particles per liter of latex ($N_p$ [$10^{17}$/L]) before and after each cycle of coagulation and redispersion.

| Run | Original | RS1 | RS2 | RS3 |
|---|---|---|---|---|
| E3 | 2.68 | 1.82 | 1.76 | 1.81 |
| E4 | 3.60 | 2.98 | 2.75 | 2.48 |
| E5 | 4.75 | 3.21 | 3.06 | 2.95 |
| E6 | 6.66 | 4.49 | 3.43 | 2.76 |

TABLE 3c

Particle volume ratio of redispersed latex to its original sample $((D_z/D_{z0})^3)$ before and after each cycle of coagulation and redispersion.

| Run | RS1 | RS2 | RS3 |
|---|---|---|---|
| E3 | 1.68 | 1.71 | 1.67 |
| E4 | 1.14 | 1.25 | 1.34 |
| E5 | 1.71 | 1.98 | 1.88 |
| E6 | 2.30 | 2.34 | 2.69 |

Example 9D

Latex Stability Against Electrolytes

The latex stability against electrolyte was studied by adding 0.5 mL of electrolyte solution to 0.5 g of latex. Three types of salts at various concentration levels were used. After 24 h, the particle sizes were measured again with the DLS. Table 4 shows the results. By adding 0.2 M NaCl solution, some coagulation was observed for run E1 and E2 samples. All of the latexes experienced a total coagulation with addition of 0.5 M NaCl solution. The increase in particle size seemed to slow from $CaCl_2$ to $AlCl_3$. The prepared latex had good stability against electrolytes, especially those with higher charges. The higher was the amidine concentration, the better was the stability against electrolyte.

TABLE 4

Latex stability against electrolytes: Changes of $D_z$ (nm).

| Run | Original | NaCl (0.2M) | NaCl (0.5M) | $CaCl_2$ (0.1M) | $CaCl_2$ (0.2M) | $AlCl_3$ (0.02M) | $AlCl_3$ (0.05M) |
|---|---|---|---|---|---|---|---|
| E1 | 157.5 | X | XX | 251.6 | X | 159.3 | 161.7 |
| E2 | 126.6 | X | XX | 142.1 | 160.6 | 129.6 | 134.7 |
| E3 | 111.5 | X | XX | 117.2 | 136.1 | 114.3 | 122.4 |
| E4 | 100.0 | X | XX | 118.2 | 147.8 | 100.1 | 108.1 |
| E5 | 90.5 | 114.6 | XX | 96.6 | 130.2 | 92.9 | 95.2 |
| E6 | 78.9 | 98.5 | XX | 83.8 | 104.6 | 83.1 | 91.8 |

In Table 4, $D_z$ was determined by adding 0.5 mL of an electrolyte solution to 0.5 g of latex. After 24 h, the particle size was measured again with DLS. "XX" designates total coagulation on salt addition; "X" designates some coagulation on salt addition, but total coagulation after 24 h.

Example 10

Conclusions

An $N_2/CO_2$-triggered reversibly coagulatable and redispersible polystyrene latex system. The latexes were prepared through emulsion polymerization of styrene employing a small amount of reactive switchable surfactant bearing both vinyl and amidine functions. The surface activity of the surfactant was reversibly switchable, as the amidine function could be shifted between ionic and neutral states by alternatively bubbling $CO_2$ and $N_2$. The surfactant molecules acted as an effective stabilizer in the emulsion polymerization and became unwashable upon incorporation into polystyrene chains. The latex particles thus formed could be easily coagulated by bubbling $N_2$ with slight heating, without salt, acid, or base addition as often required. The coagulated particles could be redispersed into water by bubbling $CO_2$ and ultrasonication to form a stable latex, without extra stabilizer addition. The coagulation and redispersion processes were repeatable. The redispersed latexes showed good stability against electrolytes.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

Additional Embodiments

The present invention provides for the following exemplary embodiments, the numbering of which is not to be construed as designating levels of importance:

Embodiment 1 provides a method of treating a subterranean formation comprising: obtaining or providing a polymer comprising at least one monomer comprising a switchable-amphiphilic functional group; and contacting the polymer with a subterranean material downhole.

Embodiment 2 provides the method of Embodiment 1, further comprising combining the polymer with a liquid comprising water.

Embodiment 3 provides the method of Embodiment 2, wherein the combining with water is performed prior to contacting the polymer with the subterranean material.

Embodiment 4 provides the method of any one of Embodiments 2-3, further comprising increasing an aqueous emulsion of the polymer.

Embodiment 5 provides the method of Embodiment 4, wherein increasing the aqueous emulsion comprises ionizing the switchable-amphiphilic functional group.

Embodiment 6 provides the method of any one of Embodiments 4-5, wherein increasing the aqueous emulsion comprises bubbling a gas comprising $CO_2$ through the liquid comprising water.

Embodiment 7 provides the method of any one of Embodiments 2-6, further comprising decreasing an aqueous emulsion of the polymer.

Embodiment 8 provides the method of Embodiment 7, wherein lessening the aqueous emulsion comprises neutralizing the switchable-amphiphilic functional group.

Embodiment 9 provides the method of any one of Embodiments 7-8, wherein lessening the aqueous emulsion comprises at least one of bubbling a gas comprising at least one of a noble gas and $N_2$ through the aqueous emulsion and applying sufficient heat to the aqueous emulsion.

Embodiment 10 provides the method of any one of Embodiments 4-9, wherein the increasing of the emulsion is performed prior to contacting the polymer with the subterranean material.

Embodiment 11 provides the method of any one of Embodiments 7-10, wherein the lessening of the emulsion is performed prior to contacting the polymer with the subterranean material.

Embodiment 12 provides the method of any one of Embodiments 1-11, further comprising combining the polymer with an aqueous fluid comprising a drilling fluid, stimulation fluid, fracking fluid, spotting fluid, clean-up fluid, production fluid, completion fluid, remedial treatment fluid, abandonment fluid, pill, acidizing fluid, cementing fluid, or a combination thereof, to form a mixture, and subsequently contacting the subterranean material with the mixture.

Embodiment 13 provides a composition for treatment of a subterranean formation comprising: at least one polymer comprising at least one monomer comprising a switchable-amphiphilic functional group; and a drilling fluid, stimulation fluid, fracking fluid, spotting fluid, clean-up fluid, production fluid, completion fluid, remedial treatment fluid, abandonment fluid, pill, acidizing fluid, a cementing fluid, or a combination thereof.

Embodiment 14 provides the composition of Embodiment 13, wherein the switchable-amphiphilic functional groups in the polymer are predominantly in an ionized form, and wherein the polymer forms an emulsion with the drilling fluid, stimulation fluid, fracking fluid, spotting fluid, clean-up fluid, production fluid, completion fluid, remedial treatment fluid, abandonment fluid, pill, acidizing fluid, cementing fluid, or combination thereof.

Embodiment 15 provides the composition of any one of Embodiments 13-14, wherein the drilling fluid, stimulation fluid, fracking fluid, spotting fluid, clean-up fluid, production fluid, completion fluid, remedial treatment fluid, abandonment fluid, pill, acidizing fluid, cementing fluid, or combination thereof is an aqueous fluid.

Embodiment 16 provides the composition of any one of Embodiments 13-15, wherein the drilling fluid, stimulation fluid, fracking fluid, spotting fluid, clean-up fluid, production fluid, completion fluid, remedial treatment fluid, abandonment fluid, pill, acidizing fluid, and a cementing fluid is a pill, water-based drilling fluid, an aqueous mixture comprising at least one of cement and cement kiln dust, or a combination thereof.

Embodiment 17 provides the composition of Embodiment 13, wherein the monomer comprising the switchable-amphiphilic functional group is derived from a compound containing a vinyl group.

Embodiment 18 provides the composition of any one of Embodiments 13-16, wherein the switchable-amphiphilic functional group comprises an amidine group.

Embodiment 19 provides the composition of any one of Embodiments 13-17, wherein the switchable-amphiphilic functional group is connected to the polymer via at least one linking group.

Embodiment 20 provides the composition of any one of Embodiments 13-18, wherein the switchable-amphiphilic group is

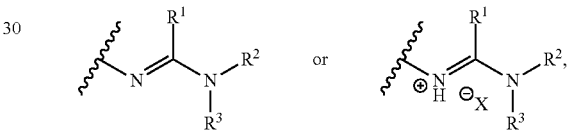

wherein $X^-$ is a counterion; wherein $R^1$, $R^2$, and $R^3$ are independently at each occurrence selected from the group consisting of $(C_1-C_{10})$alkyl, $(C_2-C_{10})$alkenyl, $(C_2-C_{10})$alkynyl, $(C_1-C_{10})$haloalkyl, $(C_1-C_{10})$alkoxy, $(C_1-C_{10})$haloalkoxy, $(C_4-C_{10})$cycloalkyl$(C_0-C_{10})$alkyl, $(C_1-C_{10})$heterocyclyl$(C_0-C_{10})$alkyl, $(C_6-C_{10})$aryl$(C_0-C_{10})$alkyl, and $(C_1-C_{10})$heteroaryl$(C_0-C_{10})$alkyl; wherein each alkyl, alkenyl, alkynyl, haloalkyl, alkoxy, haloalkoxy, cycloalkyl, aryl, heterocyclyl, and heteroaryl is independently unsubstituted or further substituted with at least one J; and wherein J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, C(O)$CH_2$C(O)R, C(S)R, C(O)OR, OC(O)R, OC(O)OR, C(O)N(R)_2$, $OC(O)N(R)_2$, $C(S)N(R)_2$, $(CH_2)_{0-2}NHC(O)R$, $N(R)N(R)C(O)R$, $N(R)N(R)C(O)OR$, $N(R)N(R)C(O)N(R)_2$, $N(R)SO_2R$, $N(R)SO_2N(R)_2$, $N(R)C(O)OR$, $N(R)C(O)R$, $N(R)C(S)R$, $N(R)C(O)N(R)_2$, $N(R)C(S)N(R)_2$, $N(C(O)R)C(O)R$, $N(OR)R$, $C(=NH)N(R)_2$, $C(O)N(OR)R$, and $C(=NOR)R$, wherein R is independently at each occurrence chosen from hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J.

Embodiment 21 provides the composition of Embodiment 20, wherein $X^-$ independently at each occurrence is selected from the group consisting of fluoride, chloride, bromide, iodide, nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate, acetate, formate, oxide, sulfide, nitride, arsenate, phosphate, arsenite, hydrogen phosphate, sulfate, thiosulfate, sulfite, carbonate, chromate, dichromate, peroxide, and oxalate.

Embodiment 22 provides the composition of any one of Embodiments 20-21, wherein $X^-$ is $HCO_3^-$.

Embodiment 23 provides the composition of any one of Embodiments 20-22, wherein $R^1$, $R^2$, and $R^3$ are independently at each occurrence $(C_1-C_5)$alkyl.

Embodiment 24 provides the composition of any one of Embodiments 20-23, wherein $R^1$, $R^2$, and $R^3$ are each methyl.

Embodiment 25 provides the composition of any one of Embodiments 13-24, wherein the monomer comprising the switchable-amphiphilic functional group is

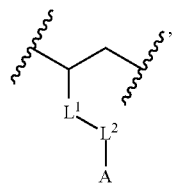

wherein linking group $L^1$ independently at each occurrence is selected from the group consisting of a bond, O, S, C(O), S(O), methylenedioxy, ethylenedioxy, NR', SR'$_2$, SO$_2$R', SO$_2$NR', SO$_3$, C(O)C(O), C(O)CH$_2$C(O), C(S), C(O)O, OC(O), OC(O)O, C(O)NR', OC(O)NR', C(S)NR', (CH$_2$)$_{0-2}$NHC(O), N(R')N(R')C(O), N(R')N(R')C(O)O, N(R')N(R')C(O)NR', N(R')SO$_2$, N(R')SO$_2$NR', N(R')C(O)O, N(R')C(O), N(R')C(S), N(R')C(O)NR', N(R')C(S)NR', N(C(O)R')C(O), N(OR'), C(=NH)NR', C(O)N(OR'), and C(=NOR'), wherein R' is independently at each occurrence chosen from hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$ aryl, $(C_1-C_{10})$ aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J'; linking group $L^2$ independently at each occurrence is selected from the group consisting of a bond, $(C_1-C_{30})$alkylene, $(C_2-C_{30})$alkenylene, $(C_2-C_{30})$alkynylene, $(C_1-C_{30})$haloalkylene, $(C_1-C_{30})$alkoxylene, $(C_1-C_{30})$haloalkoxylene, $(C_4-C_{30})$cycloalkyl$(C_0-C_{30})$alkylene, $(C_1-C_{30})$heterocyclyl$(C_0-C_{30})$alkylene, $(C_6-C_{30})$aryl$(C_0-C_{30})$alkylene, and $(C_1-C_{30})$heteroaryl$(C_0-C_{30})$alkylene; wherein each alkylene, alkenylene, alkynylene, haloalkylene, alkoxylene, haloalkoxylene, cycloalkylene, arylene, heterocyclylene, and heteroarylene is independently unsubstituted or further substituted with at least one J', wherein at least one of $L^1$ and $L^2$ is not a bond; J' independently at each occurrence is selected from the group consisting of F, Cl, Br, I, OR', CN, CF$_3$, OCF$_3$, R', O, S, C(O), S(O), methylenedioxy, ethylenedioxy, N(R')$_2$, SR', S(O)R', SO$_2$R', SO$_2$N(R')$_2$, SO$_3$R', C(O)R', C(O)C(O)R', C(O)CH$_2$C(O)R', C(S)R', C(O)OR', OC(O)R', OC(O)OR', C(O)N(R')$_2$, OC(O)N(R')$_2$, C(S)N(R')$_2$, (CH$_2$)$_{0-2}$NHC(O)R', N(R')N(R') C(O)R', N(R')N(R')C(O)OR', N(R')N(R')C(O)N(R')$_2$, N(R') SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(C(O) R')C(O)R', N(OR')R', C(=NH)N(R')$_2$, C(O)N(OR')R', and C(=NOR')R'; and A is the switchable-amphiphilic functional group.

Embodiment 26 provides the composition of Embodiment 25, wherein $L^1$ is selected from the group consisting of C(O), S(O), NH, SO$_2$NH, C(O)C(O), C(O)CH$_2$C(O), C(S), C(O)O, OC(O), OC(O)O, C(O)NH, OC(O)NH, C(S)NH, (CH$_2$)$_{0-2}$NHC(O), NHC(O)O, NHC(O), NHC(S), NHC(O) NH, and NHC(S)NH.

Embodiment 27 provides the composition of any one of Embodiments 25-26, wherein $L^1$ is C(O)NH, wherein the C(O) group is directly bound to the polymer backbone.

Embodiment 28 provides the composition of any one of Embodiments 25-27, wherein $L^2$ is selected from the group consisting of $(C_1-C_{30})$alkylene, $(C_2-C_{30})$alkenylene, $(C_2-C_{30})$alkynylene, $(C_1-C_{30})$haloalkylene, $(C_1-C_{30})$alkoxylene, $(C_1-C_{30})$haloalkoxylene, and $(C_4-C_{30})$cycloalkyl$(C_0-C_{30})$ alkylene; wherein each alkylene, alkenylene, alkynylene, haloalkylene, alkoxylene, haloalkoxylene, and cycloalkylene is unsubstituted.

Embodiment 29 provides the composition of any one of Embodiments 25-28, wherein $L^2$ is independently at each occurrence selected from the group consisting of $(C_5-C_{20})$ hydrocarbylene, $(C_5-C_{20})$alkylene, $(C_5-C_{20})$alkenylene, and $(C_5-C_{20})$alkynylene.

Embodiment 30 provides the composition of any one of Embodiments 13-29, wherein the monomer comprising the switchable-amphiphilic functional group is

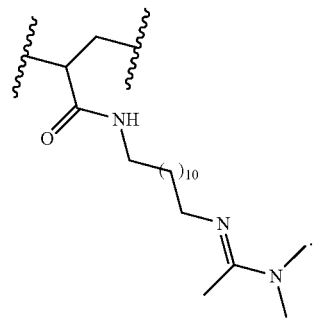

Embodiment 31 provides the composition of any one of Embodiments 13-30, wherein the polymer is a copolymer comprising at least two different monomers, wherein in addition to the monomer comprising the switchable-amphiphilic functional group the polymer further comprises monomer $M^2$, wherein $M^2$ is derived from a compound comprising a vinyl functional group.

Embodiment 32 provides the composition of any one of Embodiments 13-31, wherein the polymer comprises at least monomer derived from styrene, $(C_1-C_5)$alkyl acrylate, $(C_1-C_5)$alkyl methacrylate, acrylonitrile, butadiene, or vinyl acetate.

Embodiment 33 provides the composition of any one of Embodiments 13-32, wherein the polymer is a copolymer comprising at least three different monomers.

Embodiment 34 provides the composition of any one of Embodiments 31-33, wherein the polymer is a random copolymer having the following structure

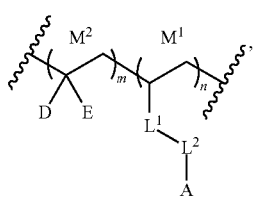

wherein monomers $M^1$ and $M^2$ have a random arrangement within the polymer; wherein monomers $M^1$ and $M^2$ independently at each occurrence have the orientation shown or the opposite orientation; wherein E independently at each occurrence is selected from the group consisting of hydrogen, F, Cl, Br, I, $(C_1-C_{10})$alkoxy, and $(C_1-C_{10})$alkyl; wherein D independently at each occurrence is selected from the group consisting of Q, $(C_1-C_{10})$alkyl, $(C_2-C_{10})$alkenyl, $(C_2-C_{10})$alkynyl, $(C_1-C_{10})$haloalkyl, $(C_1-C_{10})$alkoxy, $(C_1-C_{10})$haloalkoxy, $(C_4-C_{10})$cycloalkyl$(C_0-C_{10})$alkyl, $(C_1-C_{10})$heterocyclyl$(C_0-C_{10})$alkyl, $(C_6-C_{10})$aryl$(C_0-C_{10})$alkyl, and $(C_1-C_{10})$heteroaryl$(C_0-C_{10})$alkyl; wherein each alkyl, alkenyl, alkynyl, haloalkyl, alkoxy, haloalkoxy, cycloalkyl, aryl, heterocyclyl, and heteroaryl is independently unsubstituted or further substituted with at least one J"; wherein Q independently at each occurrence is selected from the group consisting of F, Cl, Br, I, OR", $CF_3$, $OCF_3$, R", CN, C(O), S(O), $N(R")_2$, SR", S(O)R", $SO_2R"$, $SO_2N(R")_2$, $SO_3R"$, C(O)R", C(O)C(O)R", $C(O)CH_2C(O)R"$, C(S)R", C(O)OR", OC(O)R", OC(O)OR", $C(O)N(R")_2$, $OC(O)N(R")_2$, $C(S)N(R")_2$, $(CH_2)_{0-2}NHC(O)R"$, N(R")N(R")C(O)R", N(R")N(R")C(O)OR", $N(R")N(R")C(O)N(R")_2$, $N(R")SO_2R"$, $N(R")SO_2N(R")_2$, N(R")C(O)OR", N(R")C(O)R", N(R")C(S)R", $N(R")C(O)N(R")_2$, $N(R")C(S)N(R")_2$, N(C(O)R")C(O)R", N(OR")R", $C(=NH)N(R")_2$, and C(O)N(OR")R"; wherein J" independently at each occurrence is selected from the group consisting of F, Cl, Br, I, OR", CN, $CF_3$, $OCF_3$, R", O, S, C(O), S(O), methylenedioxy, ethylenedioxy, $N(R")_2$, SR", S(O)R", $SO_2R"$, $SO_2N(R")_2$, $SO_3R"$, C(O)R", C(O)C(O)R", $C(O)CH_2C(O)R"$, C(S)R", C(O)OR", OC(O)R", OC(O)OR", $C(O)N(R")_2$, $OC(O)N(R")_2$, $C(S)N(R")_2$, $(CH_2)_{0-2}NHC(O)R"$, N(R")N(R")C(O)R", N(R")N(R")C(O)OR", $N(R")N(R")C(O)N(R")_2$, $N(R")SO_2R"$, $N(R")SO_2N(R")_2$, N(R")C(O)OR", N(R")C(O)R", N(R")C(S)R", $N(R")C(O)N(R")_2$, $N(R")C(S)N(R")_2$, N(C(O)R")C(O)R", N(OR")R", $C(=NH)N(R")_2$, C(O)N(OR")R", and C(=NOR")R"; and wherein R" is independently at each occurrence is selected from the group consisting of hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J".

Embodiment 35 provides the composition of Embodiment 34, wherein E independently at each occurrence is selected from the group consisting of hydrogen and $(C_1-C_2)$alkyl; D independently at each occurrence is selected from the group consisting of CN, OC(O)R", C(O)OR", and $(C_6-C_{10})$aryl unsubstituted or further substituted with at least one J"; and J" independently at each occurrence is selected from the group consisting of F, Cl, Br, I, OR", CN, $CF_3$, $OCF_3$, R", O, S, C(O), S(O), methylenedioxy, ethylenedioxy, $N(R")_2$, SR", S(O)R", $SO_2R"$, $SO_2N(R")_2$, $SO_3R"$, C(O)R", C(O)C(O)R", $C(O)CH_2C(O)R"$, C(S)R", C(O)OR", OC(O)R", OC(O)OR", $C(O)N(R")_2$, $OC(O)N(R")_2$, $C(S)N(R")_2$, $(CH_2)_{0-2}NHC(O)R"$, N(R")N(R")C(O)R", N(R")N(R")C(O)OR", $N(R")N(R")C(O)N(R")_2$, $N(R")SO_2R"$, $N(R")SO_2N(R")_2$, N(R")C(O)OR", N(R")C(O)R", N(R")C(S)R", $N(R")C(O)N(R")_2$, $N(R")C(S)N(R")_2$, N(C(O)R")C(O)R", N(OR")R", $C(=NH)N(R")_2$, C(O)N(OR")R", and C(=NOR")R", wherein R" is chosen from hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J".

Embodiment 36 provides the composition of any one of Embodiments 34-35, wherein E independently at each occurrence is selected from the group consisting of hydrogen and $(C_1-C_2)$alkyl; D independently at each occurrence is selected from the group consisting of CN, OC(O)R", C(O)OR", and $(C_6-C_{10})$aryl; and R" is independently at each occurrence $(C_1-C_5)$alkyl.

Embodiment 37 provides the composition of any one of Embodiments 13-36, wherein the polymer has the following structure:

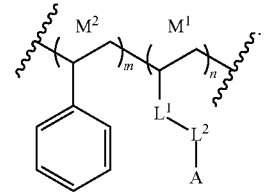

Embodiment 38 provides the composition of any one of Embodiments 13-37, wherein $(n/(n+m))*100$ is about 0.001-20.

Embodiment 39 provides the composition of any one of Embodiments 13-38, wherein $(n/(n+m))*100$ is about 0.10-5.

Embodiment 40 provides the composition of any one of Embodiments 13-39, wherein the mole percent of the monomer comprising the switchable-amphiphilic functional group is about 0.001%-20%.

Embodiment 41 provides the composition of any one of Embodiments 13-40, wherein the mole percent of the monomer comprising the switchable-amphiphilic functional group is about 0.10%-5%.

Embodiment 42 provides the composition of any one of Embodiments 13-41, wherein the polymer comprises polymer particles having an average diameter of about 10 nm-1000 nm.

Embodiment 43 provides the composition of any one of Embodiments 13-42, wherein the polymer comprises polymer particles having an average diameter of about 20 nm-300 nm.

Embodiment 44 provides the composition of any one of Embodiments 13-43, wherein the polymer has a degree of polymerization of about 10 to 10,000,000.

Embodiment 45 provides the composition of any one of Embodiments 13-44, wherein the polymer has a molecular weight of about 50 to 1,000,000.

Embodiment 46 provides the composition of any one of Embodiments 13-45, wherein the drilling fluid, stimulation fluid, fracking fluid, spotting fluid, clean-up fluid, production fluid, completion fluid, remedial treatment fluid, abandonment fluid, pill, or acidizing fluid comprises water, a salt, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

Embodiment 47 provides the composition of any one of Embodiments 13-46, wherein the cement comprises Portland cement, pozzolana cement, gypsum cement, high alumina content cement, slag cement, silica cement, or a combination thereof.

Embodiment 48 provides the composition of any one of Embodiments 13-47, wherein the composition further comprises fly ash, metakaolin, shale, zeolite, set retarding additive, surfactant, a gas, accelerators, weight reducing additives, heavy-weight additives, lost circulation materials, filtration control additives, dispersants, crystalline silica compounds, amorphous silica, salts, fibers, hydratable clays, microspheres, pozzolan lime, thixotropic additives, or a combination thereof.

Embodiment 49 provides a method for preparing an aqueous composition for treatment of a subterranean formation, the method comprising: obtaining or providing a polymer comprising at least one monomer comprising a switchable-amphiphilic functional group; combining the polymer with at least one of an aqueous composition comprising a drilling fluid, stimulation fluid, fracking fluid, spotting fluid, clean-up fluid, production fluid, completion fluid, remedial treatment fluid, abandonment fluid, pill, acidizing fluid, a cementing fluid, or a combination thereof.

Embodiment 50 provides the apparatus or method of any one or any combination of Embodiments 1-49 optionally configured such that all elements or options recited are available to use or select from.

What is claimed is:

1. A method of treating a subterranean formation comprising:
bubbling a gas comprising $CO_2$ through a combined polymer and liquid comprising water, the liquid comprising water comprising an aqueous fluid comprising, a drilling fluid, stimulation fluid, fracking fluid, spotting fluid, clean-up fluid, production fluid, completion fluid, remedial treatment fluid, abandonment fluid, pill, acidizing fluid, a cementing fluid, or a combination thereof, and the polymer comprising at least one monomer comprising a switchable-amphiphilic functional group, the switchable-amphiphilic functional group comprising an amidine group, wherein the monomer comprising the switchable-amphiphilic functional group has the structure:

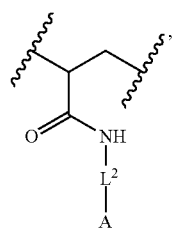

wherein
linking group $L^2$ independently at each occurrence is $(C_5-C_{20})$alkylene,
A is the switchable-amphiphilic functional group, having the structure:

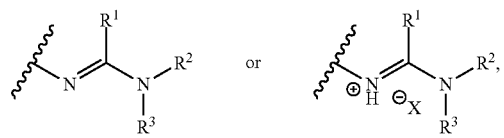

$X^-$ is a counterion,
$R^1$, $R^2$, and $R^3$ are independently at each occurrence $(C_1-C_5)$alkyl, and
bubbling the gas comprising $CO_2$ through the combined polymer and liquid ionizes the amidine group and forms a latex comprising the liquid and solid particles comprising the polymer; and placing the latex in the subterranean formation;
wherein a degree of ionization of the polymer at a first location in the subterranean formation is different than a degree of ionization of the polymer at a second location in the subterranean formation.

2. The method of claim 1, further comprising increasing an aqueous emulsion of the polymer by ionizing a greater number of the switchable-amphiphilic functional groups.

3. The method of claim 2, wherein increasing the aqueous emulsion comprises bubbling a gas comprising $CO_2$ through the liquid comprising water.

4. The method of claim 1, further comprising decreasing an aqueous emulsion of the polymer by neutralizing the switchable-amphiphilic functional group.

5. The method of claim 4, wherein lessening the aqueous emulsion comprises at least one of bubbling a gas comprising at least one of a noble gas and $N_2$ through the aqueous emulsion and applying sufficient heat to the aqueous emulsion.

6. The method of claim 2, wherein the increasing of the emulsion is performed prior to the placing the polymer in the subterranean formation.

7. The method of claim 4, wherein the lessening of the emulsion is performed prior to the placing the polymer in the subterranean formation.

8. The method of claim 1, wherein after the bubbling of the gas comprising $CO_2$, the switchable-amphiphilic functional groups in the polymer are predominantly in an ionized form.

9. The method of claim 1, wherein the drilling fluid, stimulation fluid, fracking fluid, spotting fluid, clean-up fluid, production fluid, completion fluid, remedial treatment fluid, abandomnent fluid, pill, acidizing fluid, and a cementing fluid is a pill, water-based drilling fluid, an aqueous mixture comprising at least one of cement and cement kiln dust, or a combination thereof.

10. The method of claim 1, wherein the monomer comprising the switchable-amphiphilic functional group is

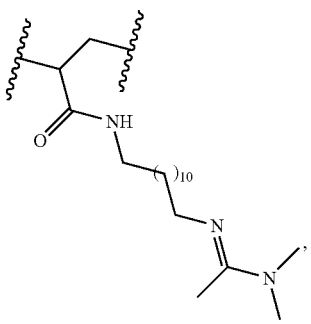

or a salt thereof.

11. The method of claim 1, wherein the polymer is a copolymer comprising at least two different monomers, wherein in addition to the monomer comprising the switchable-amphi phi lie functional group the polymer further comprises monomer $M^2$, wherein $M^2$ is derived from a compound comprising a vinyl functional group.

12. The method of claim 1, wherein the polymer is a random copolymer having the following structure

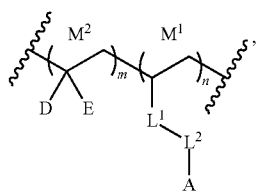

wherein the copolymer comprises n units of $M^1$ and m units of $M^2$;
wherein monomers $M^1$ and $M^2$ have a random arrangement within the polymer;
wherein monomers $M^1$ and $M^2$ independently at each occurrence have the orientation shown or the opposite orientation;
wherein $L^1$ is —C(O)—NH—;
wherein E independently at each occurrence is selected from the group consisting of hydrogen, F, Cl, Br, I, $(C_1-C_{10})$alkoxy, and $(C_1-C_{10})$alkyl;
wherein D independently at each occurrence is selected from the group consisting of Q, $(C_1-C_{10})$alkyl, $(C_2-C_{10})$alkenyl, $(C_2-C_{10})$alkynyl, $(C_1-C_{10})$haloalkyl, $(C_1-C_{10})$alkoxy, $(C_1-C_{10})$haloalkoxy, $(C_4-C_{10})$cycloalkyl $(C_0-C_{10})$alkyl, $(C_1-C_{10})$heterocyclyl$(C_0-C_{10})$alkyl, $(C_6-C_{10})$aryl$(C_0-C_{10})$alkyl, and $(C_1-C_{10})$heteroaryl$(C_0-C_{10})$alkyl; wherein each alkyl, alkenyl, alkynyl, haloalkyl, alkoxy, haloalkoxy, cycloalkyl, aryl, heterocyclyl, and heteroaryl is independently unsubstituted or further substituted with at least one J";
wherein Q independently at each occurrence is selected from the group consisting of F, Cl, Br, I, OR", $CF_3$, $OCF_3$, R", CN, C(O), S(O), $N(R")_2$, SR", S(O)R", $SO_2R"$, $SO_2N(R")_2$, $SO_3R"$, C(O)R", C(O)C(O)R", C(O)CH$_2$C(O)R", C(S)R", C(O)OR", OC(O)R", OC(O)OR", C(O)N(R")$_2$, OC(O)N(R")$_2$, C(S)N(R")$_2$, $(CH_2)_{0-2}$NHC(O)R", N(R")N(R")C(O)R", N(R")N(R")C(O)OR", N(R")N(R")C(O)N(R")$_2$, N(R")SO$_2$R", N(R")SO$_2$N(R")$_2$, N(R")C(O)OR", N(R")C(O)R", N(R")C(S)R", N(R")C(O)N(R")$_2$, N(R")C(S)N(R")$_2$, N(C(O)R")C(O)R", N(OR")R", C(=NH)N(R")$_2$, and C(O)N(OR")R";

wherein J" independently at each occurrence is selected from the group consisting of F, Cl, Br, I, OR", CN, $CF_3$, $OCF_3$, R", O, S, C(O), S(O), methylenedioxy, ethylenedioxy, N(R")$_2$, SR", S(O)R", $SO_2R"$, $SO_2N(R")_2$, $SO_3R"$, C(O)R", C(O)C(O)R", C(O)CH$_2$C(O)R", C(S)R", C(O)OR", OC(O)R", OC(O)OR", C(O)N(R")$_2$, OC(O)N(R")$_2$, C(S)N(R")$_2$, $(CH_2)_{0-2}$NHC(O)R", N(R")N(R")C(O)R", N(R")N(R")C(O)OR", N(R")N(R")C(O)N(R")$_2$, N(R")SO$_2$R", N(R")SO$_2$N(R")$_2$, N(R")C(O)OR", N(R")C(O)R", N(R")C(S)R", N(R")C(O)N(R")$_2$, N(R")C(S)N(R")$_2$, N(C(O)R")C(O)R", N(OR")R", C(=NH)N(R")$_2$, C(O)N(OR")R", and C(=NOR")R"; and
wherein R" is independently at each occurrence is selected from the group consisting of hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J".

13. The method of claim 1, wherein the polymer has the following structure:

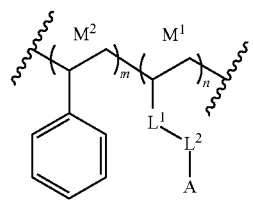

wherein the copolymer comprises n units $M^1$, and m units of $M^2$, and $L^1$ is —C(O)—NH—.

14. The method of claim 1, wherein the mole percent of the monomer comprising the switchable-amphiphilic functional group is about 0.001%-20%.

15. The method of claim 1, wherein the polymer comprises polymer particles having an average diameter of about 10 nm-1000 nm.

16. The method of claim 1, wherein the polymer has a degree of polymerization of about 10 to 10,000,000.

17. The method of claim 1, wherein the drilling fluid, stimulation fluid, fracking fluid, spotting fluid, clean-up fluid, production fluid, completion fluid, remedial treatment fluid, abandonment fluid, pill, or acidizing fluid comprises water, a salt, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

18. The method of claim 1, wherein the cementing fluid comprises Portland cement, pozzolana cement, gypsum cement, high alumina content cement, slag cement, silica cement, or a combination thereof.

19. The method of claim 1, wherein the composition further comprises fly ash, metakaolin, shale, zeolite, set retarding additive, surfactant, a gas, accelerators, weight reducing additives, heavy-weight additives, lost circulation materials, filtration control additives, dispersants, crystalline silica compounds, amorphous silica, salts, fibers, hydratable clays, microspheres, pozzol an lime, thixotropic additives, or a combination thereof.

\* \* \* \* \*